(12) United States Patent
Kudo

(10) Patent No.: US 7,944,507 B2
(45) Date of Patent: May 17, 2011

(54) VIDEO PROCESSING APPARATUS AND VIDEO PROCESSING METHOD

(75) Inventor: Shiro Kudo, Kumagaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 104 days.

(21) Appl. No.: 12/510,976

(22) Filed: Jul. 28, 2009

(65) Prior Publication Data

US 2010/0053442 A1 Mar. 4, 2010

(30) Foreign Application Priority Data

Aug. 28, 2008 (JP) ................................. 2008-220096

(51) Int. Cl.
*H04N 9/74* (2006.01)
*H04N 5/445* (2006.01)

(52) U.S. Cl. ......................... 348/581; 348/588; 348/568

(58) Field of Classification Search .................. 348/581, 348/582, 561–565, 588, 568, 556, 913; *H04N 9/74, H04N 5/445, 5/45*
See application file for complete search history.

(56) References Cited

U.S. PATENT DOCUMENTS

| 7,224,404 B2 * | 5/2007 | An et al. ........................ 348/564 |
| 2002/0067436 A1 | 6/2002 | Shirahama et al. |
| 2008/0043155 A1 | 2/2008 | Fukano |

FOREIGN PATENT DOCUMENTS

| JP | 07-212743 | 8/1995 |
| JP | H08-032889 A | 2/1996 |
| JP | H09-214857 A | 8/1997 |
| JP | 11-122557 | 4/1999 |
| JP | 2001-203989 | 7/2001 |
| JP | 2001-313880 A | 11/2001 |
| JP | 2001-326875 | 11/2001 |
| JP | 2003-169269 A | 6/2003 |
| JP | 2003-174598 A | 6/2003 |
| JP | 2003-333455 | 11/2003 |
| JP | 2006-229813 A | 8/2006 |
| JP | 2006-270231 A | 10/2006 |
| JP | 2007-058909 | 3/2007 |
| JP | 2008-048250 | 2/2008 |

OTHER PUBLICATIONS

Notification of Reasons for Refusal mailed by Japan Patent Office on Oct. 20, 2009 in the corresponding Japanese patent application No. 2008-220096.
Notification of Reasons for Refusal mailed by Japan Patent Office on Mar. 9, 2010 in the corresponding Japanese patent application No. 2008-220096.
Explanation of Non-English Language Reference(s).
Notification of the First Office Action mailed by State Intellectual Property Office of P.R.C. on Nov. 11, 2010 in the corresponding Chinese patent application No. 200910167538.0.

* cited by examiner

*Primary Examiner* — Sherrie Hsia
(74) *Attorney, Agent, or Firm* — Knobbe, Martens, Olson & Bear LLP

(57) ABSTRACT

A video processing apparatus includes: a reception module configured to selectively receive signals; a signal processing module configured to perform signal processing on a signal received by the reception module; a video processor configured to process the signal performed with the signal processing to output a video signal for displaying an image contained in the signal; and a control module configured to control the reception module, the signal processing module, and the video processor, wherein the control module includes: a storing module configured to store pieces of video size information being set for respective categories; and a video size switching module configured to switch the video size based on the pieces of video size information stored in the storing module.

17 Claims, 18 Drawing Sheets

VIDEO PROCESSING APPARATUS AND VIDEO PROCESSING METHOD

CROSS REFERENCE TO RELATED APPLICATION(S)

The present disclosure relates to the subject matters contained in Japanese Patent Application No. 2008-220096 filed on Aug. 28, 2008, which are incorporated herein by reference in its entirety.

FIELD

The present invention relates to a video processing apparatus and a video processing method for changing a size of a video to be displayed.

BACKGROUND

As is well known, the digitization of the TV broadcast has proceeded in recent years and is currently in progress. For example, in Japan, not only the satellite broadcast such as the BS (broadcasting satellite) digital broadcast and the 110 degrees CS (communications satellite) digital broadcast but also the ground-wave digital broadcast has started.

In the digital TV broadcast, not only video having an aspect ratio 16:9 but also video in which the aspect ratio is changed to 16:9 by adding side panels or side panels and letter boxes to video having an aspect ratio 4:3.

Therefore, for example, video processing apparatus are provided with a video size mode (hereinafter referred to as a full mode) in which received video having an aspect ratio 16:9 is displayed as it is and a video size mode (hereinafter referred to as an HD super live mode) in which only a central video portion of received video having an aspect ratio 16:9 is displayed on the screen by removing the side panels that are added to video having an aspect ratio 4:3.

A 16:9 signal (what is called a frame-added signal) produced by adding side panels to a video signal with letter boxes is also broadcast. Therefore, video processing apparatus are also provided with a video size mode (hereinafter referred to as an HD zoom mode) in which only a central video portion is displayed on the screen by removing both of the side panels and the letter boxes.

Conventionally, a video processing apparatus for displaying a digital TV broadcast has been proposed which displays video in various video sizes using a past viewing pattern of the user (history information). An example of such apparatus is disclosed in JP-A-2003-174598 (counterpart U.S. publication is: U.S. Pat. No. 6,943,845 B2).

In a mode (hereinafter referred to as a two-picture mode) in which two pieces of video are displayed on the screen, for example, the screen having an aspect ratio 16:9 is divided into two regions each having an aspect ratio 8:9 and pictures are displayed on the respective regions. An example of an apparatus employed with such mode is disclosed in JP-A-2003-169269.

In connection with this mode, video processing apparatus are provided with a video size mode (hereinafter referred to as a two-picture full mode) in which a received video signal having an aspect ratio 16:9 is displayed as it is, a video size mode (hereinafter referred to as a two-picture side-cut mode) in which a received video signal having an aspect ratio 16:9 produced by adding side panels to a video signal having an aspect ratio 4:3 is displayed after removing the side panels from it, and other video size modes.

As for the setting of a video size mode, one method is that a setting is made temporary and the mode is returned to the full mode upon tuning. Another method is that video size mode setting information is stored in a nonvolatile memory and the mode is not returned to the full mode even if tuning done.

However, where the mode is returned to the full mode upon tuning, if zapping is done in an event for which the user switched the video size mode, the user cannot view the same event with the previously set video size mode; the user needs to switch the video size mode again.

Where video size mode setting information is stored in a nonvolatile memory and the mode is not returned to the full mode even if tuning is done, if, for example, the user set the video size mode to the HD super live mode, video having an aspect ratio 16:9 and not having side panels may actually be displayed in such a manner that video portions that should be displayed are omitted. As a result, in, for example, viewing a different event, the user needs to re-set the video size mode.

SUMMARY

Therefore, one of objects of the invention is to provide an easy-to-use apparatus and method which allows a user to save time and labor for switching the video size mode.

According to an aspect of the present invention, there is provided a video processing apparatus including: a reception module configured to selectively receive signals; a signal processing module configured to perform signal processing on a signal received by the reception module; a video processor configured to process the signal performed with the signal processing to output a video signal for displaying an image contained in the signal; and a control module configured to control the reception module, the signal processing module, and the video processor, wherein the control module includes: a storing module configured to store pieces of video size information being set for respective categories; and a video size switching module configured to switch the video size based on the pieces of video size information stored in the storing module.

According to another aspect of the present invention, there is provided a method for processing video by a video processing apparatus including: a reception module configured to selectively receive signals; a signal processing module configured to perform signal processing on a signal received by the reception module; a video processor configured to process the signal performed with the signal processing to output a video signal for displaying an image contained in the signal; and a control module configured to control the reception module, the signal processing module, and the video processor, wherein the method including: storing, in the storing module of the control module, pieces of video size information being set for respective categories; and switching the video size based on the pieces of the stored video size information.

BRIEF DESCRIPTION OF THE DRAWINGS

A general configuration that implements the various feature of the invention will be described with reference to the drawings. The drawings and the associated descriptions are provided to illustrate embodiments of the invention and not to limit the scope of the invention.

DETAILED DESCRIPTION OF THE EMBODIMENTS

Figure 1:
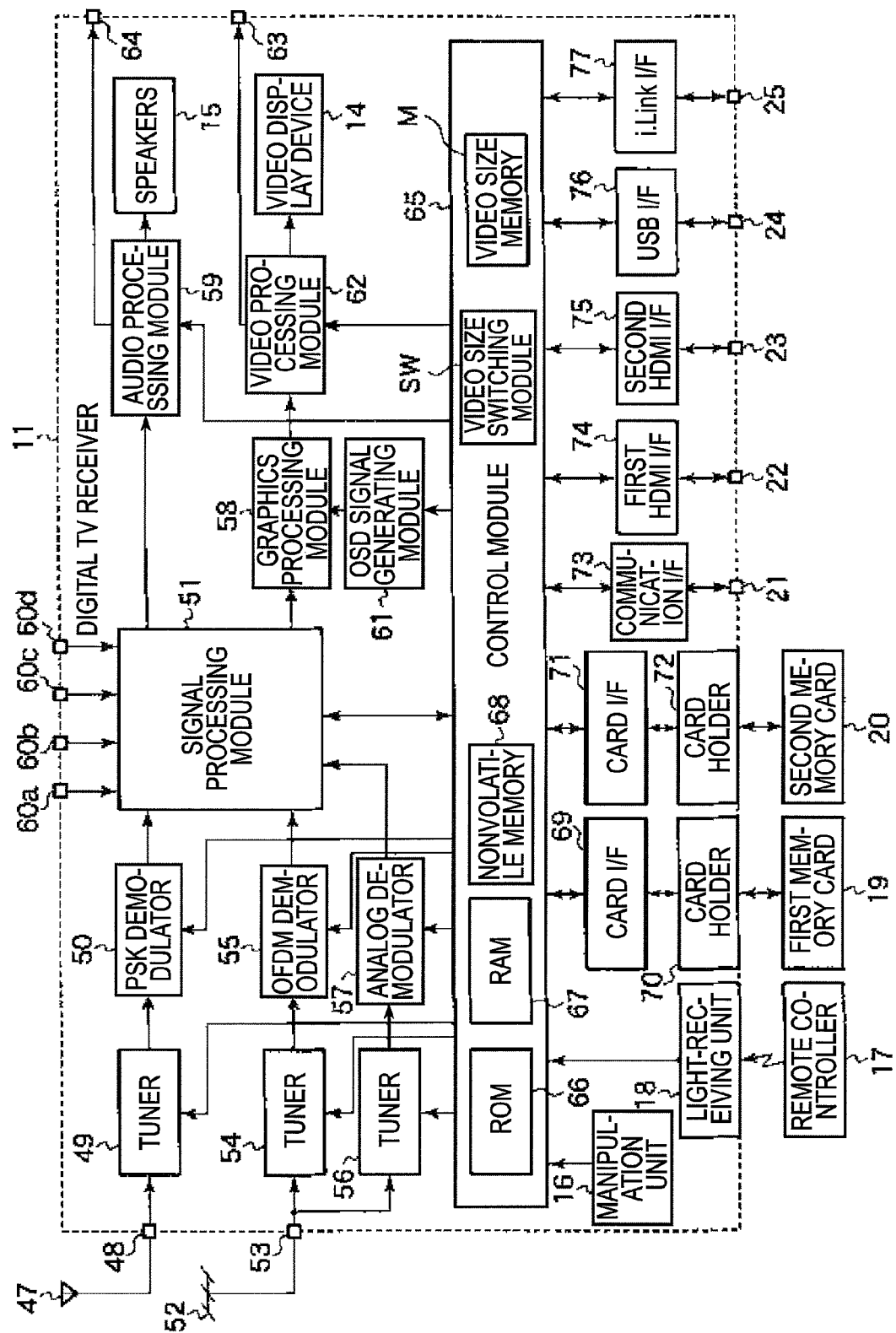
FIG. 1 schematically shows an example configuration of a video processing apparatus according to a first embodiment of the present invention.

A video processing apparatus according to a first embodiment of the present invention will be described below with reference to the drawings. The video processing apparatus according to this embodiment is a digital TV broadcast receiver 11 shown in FIG. 1. A satellite digital TV broadcast signal received by a BS/CS digital broadcast receiving antenna 47 is supplied via an input terminal 48 to a satellite digital broadcast tuner 49, where a broadcast signal on a desired channel is selected.

The broadcast signal selected by the tuner 49 is supplied to a PSK (phase shift keying) demodulator 50, where it is demodulated into a digital video signal and audio signal, which are output to a signal processor 51.

A ground-wave digital TV broadcast signal received by a ground-wave broadcast receiving antenna 52 is supplied via an input terminal 53 to a ground-wave digital broadcast tuner 54, where a broadcast signal on a desired channel is selected.

The broadcast signal selected by the tuner 54 is supplied to an OFDM (orthogonal frequency division multiplexing) demodulator 55, where it is demodulated into a digital video signal and audio signal, which are output to the signal processor 51.

A ground-wave analog TV broadcast signal received by the ground-wave broadcast receiving antenna 52 is supplied via the input terminal 53 to a ground-wave analog broadcast tuner 56, where a broadcast signal on a desired channel is selected. The broadcast signal selected by the tuner 56 is supplied to an analog demodulator 57, where it is demodulated into an analog video signal and audio signal, which are output to the signal processor 51.

The signal processor 51 performs given digital signal processing selectively on the sets of a digital video signal and audio signal that are supplied from the PSK demodulator 50 and the OFDM demodulator 55, and outputs resulting signals to a graphics processor 58 and an audio processor 59, respectively.

Plural (in the illustrated example, four) input terminals 60a, 60b, 60c, and 60d are connected to the signal processor 51. Each of the input terminals 60a-60d enables input of an analog video signal and audio signal from external devices connected to the digital TV broadcast receiver 11.

The signal processor 51 selectively digitizes the sets of an analog video signal and audio signal that are supplied from the analog demodulator 57 and the input terminals 60a-60d, performs given digital signal processing on a resulting digital video signal and audio signal, and outputs resulting signals to the graphics processor 58 and the audio processor 59, respectively.

The graphics processor 58 has a function of superimposing an OSD signal generated by an OSD (on-screen display) signal generator 61 on the digital video signal supplied from the signal processor 51, and outputting a resulting signal. The graphics processor 58 can selectively output the output video signal of the signal processor 51 and the output OSD signal of the OSD signal generator 61 or output these two output signals in such a manner that they are combined so as to be displayed on respective half portions of the screen.

The digital video signal that is output from the graphics processor 58 is supplied to a video processor 62. The video processor 62 converts the received digital video signal into an analog video signal having such a format as to be displayed on a video display device 14. The video processor 62 outputs the analog video signal to the video display device 14 to display it and also outputs it to the outside via an output terminal 63. The video display device 14 used in the embodiment has a screen whose aspect ratio is 16:9.

The audio processor 59 converts the received digital audio signal into an analog audio signal having such a format as to be reproduced by speakers 15. The audio processor 59 outputs the analog audio signal to the speakers to reproduce it and also outputs it to the outside via an output terminal 64.

The operations, including the above various receiving operations, of the digital TV broadcast receiver 11 are controlled by a controller 65 in a unified manner. In response to manipulation information supplied from a manipulation unit 16 or manipulation information that is received from a remote controller 17 via a light-receiving unit 18, the controller 65, which incorporates a CPU (central processing unit) or the like, controls other components in such a manner that the content of the manipulation information is reflected in the control.

In doing so, the controller 65 mainly uses a ROM (read-only memory) 66 which is stored with control programs to be run by the CPU, a RAM (random access memory) 67 which provides a work area for the CPU, and a nonvolatile memory 68 which is stored with various kinds of setting information, control information, etc.

The controller 65 is connected via a card I/F (interface) 69 to a card holder 70 into which a first memory card 19 can be inserted. The controller 65 can thus exchange information via the card I/F 69 with the first memory card 19 that is inserted in the card holder 70.

The controller 65 is connected to a LAN terminal 21 via a communication I/F 73. The controller 65 can thus exchange information via the communication I/F 73 with a LAN-compatible HDD (not shown) that is connected to the LAN terminal 21. Having a DHCP (dynamic host configuration protocol) server function, the controller 65 controls the LAN-compatible HDD connected to the LAN terminal 21 by assigning an IP (Internet protocol) address to the connected device.

The controller 65 is connected to a first HDMI terminal 22 via a first HDMI I/F 74. The controller 65 can thus exchange information via the first HDMI I/F 74 with each device (not shown) that is connected to the first HDMI terminal 22. The controller 65 is also connected to a second HDMI terminal 23 via a second HDMI I/F 75. The controller 65 can thus exchange information via the second HDMI I/F 75 with each device (not shown) that is connected to the second HDMI terminal 23.

The controller 65 is connected to a USB terminal 24 via a USB I/F 76. The controller 65 can thus exchange information via the USB I/F 76 with each device (not shown) that is connected to the USB terminal 24.

Furthermore, the controller 65 is connected to an i.LINK terminal 25 via an i.LINK I/F 77. The controller 65 can thus exchange information via the i.LINK I/F 77 with each device (not shown) that is connected to the i.LINK terminal 25.

The controller 65 is also equipped with a video size switching module SW for changing the size of video to be displayed on the video display device 14 and a video size memory M which serves as a storing module for storing video sizes that are set for respective items of a certain category. In the embodiment, video sizes that were set for respective events (programs) are stored in the video size memory M.

When a command to switch the video size is input by, for example, a manipulation on the remote controller 17, the video size switching module SW stores the thus-set video size in the video size memory M. For example, if a command to switch the video size to the HD super live size, the video size switching module SW stores, in the video size memory M, video size information which includes an event ID of an event (program) for which the video size has been switched and the set video size. In the video processing apparatus according to the embodiment, the initial video size setting is the full size.

When the user has tuned in, the video size switching module SW checks whether video size information of the selected event is stored in the video size memory M. If video size information of the selected event is stored in the video size memory M, the video size switching module SW causes display of the event with the video size stored in the video size memory M.

For example, if an event is selected by the user and the video size of the selected event that is stored in the video size memory M is the HD super live size, the video size switching module SW causes display of the event selected by the user in the HD super live mode.

Figure 4:
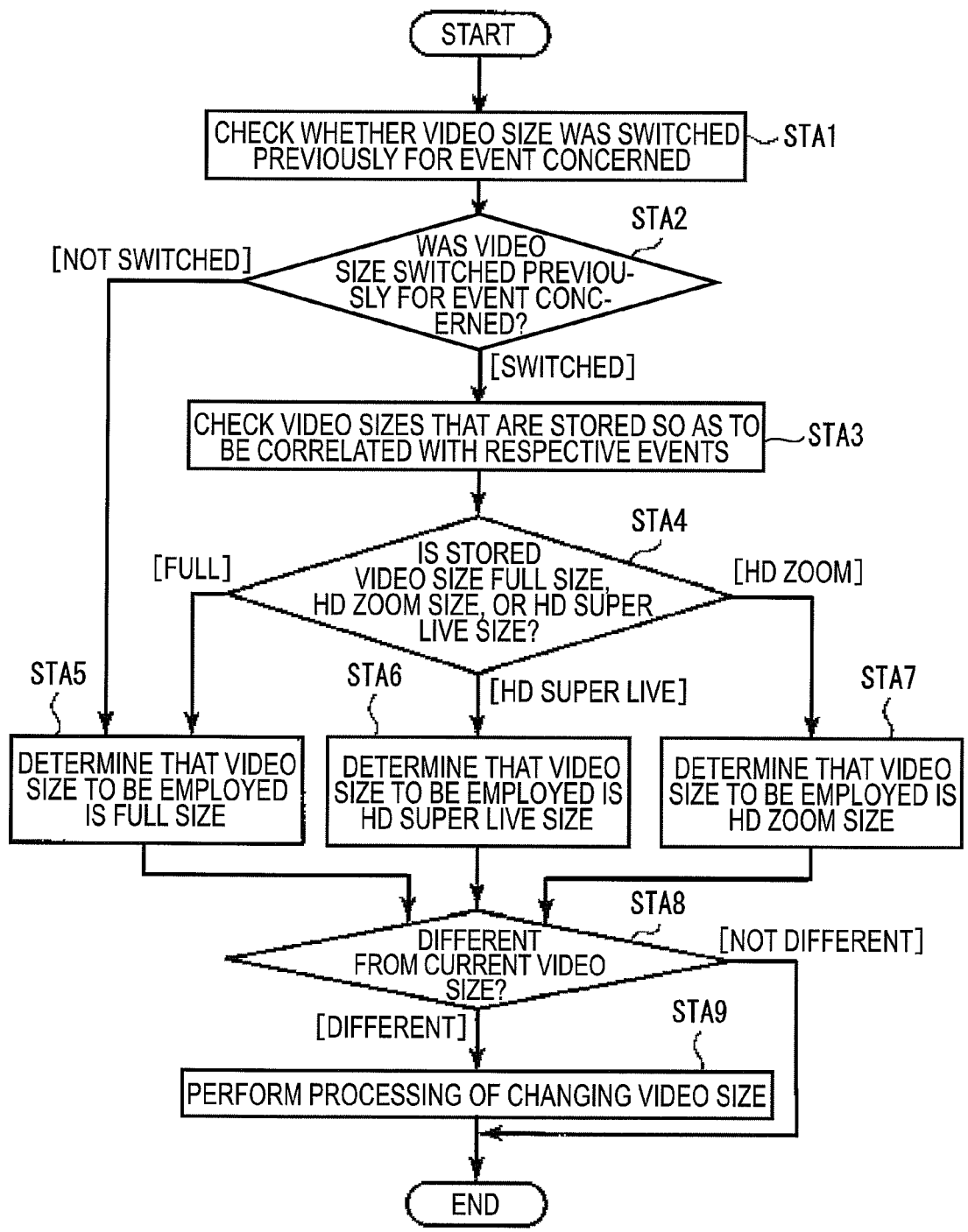
FIG. 4 is a flowchart showing an example video size switching control method in the video processing apparatus according to the first embodiment of the invention.
Figure 5:
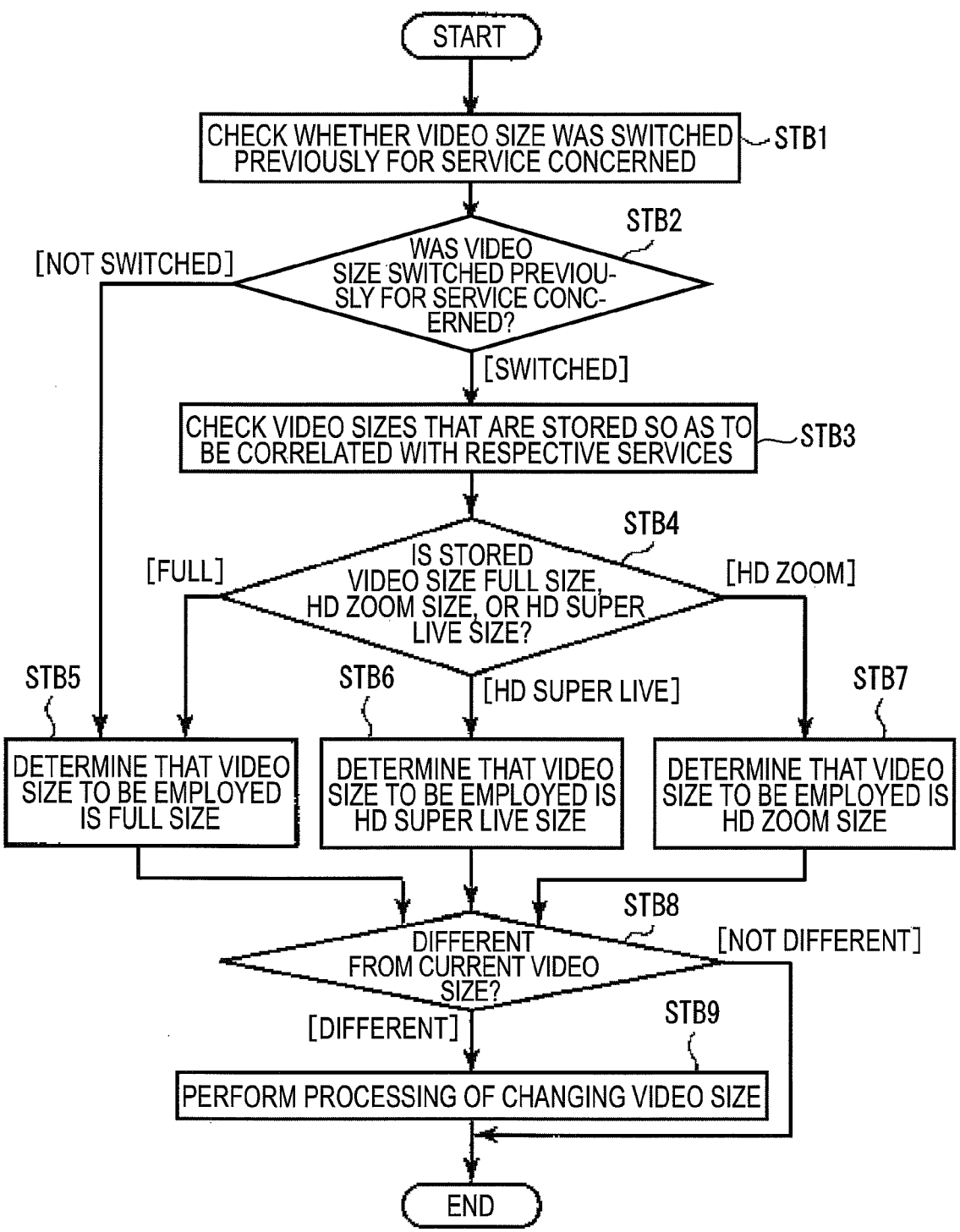
FIG. 5 is a flowchart showing an example video size switching control method in a video processing apparatus according to a second embodiment of the invention.

More specifically, as shown in FIG. 4, if an event is selected by, for example, the user's operation input to the remote controller 17, first the video size switching module SW checks at step STA1 whether the video size was switched previously for the event selected by the user.

If the video size was not switched previously for the selected event (step STA2), at step STA5 the video size switching module SW determines that the video size that should be employed in displaying the selected event is the full size.

Figure 2A:
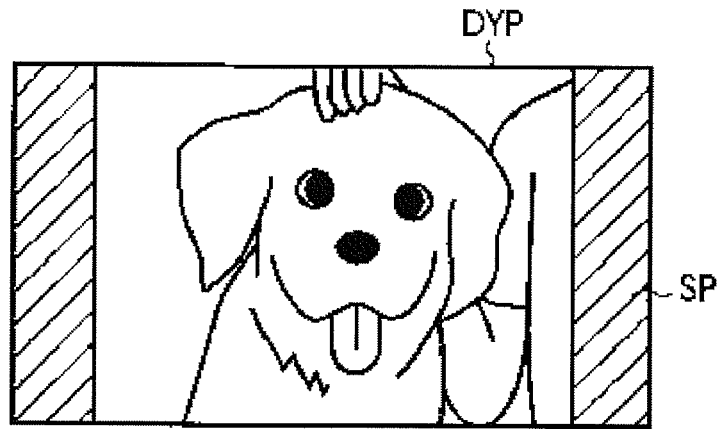
FIG. 2A shows an example of display in which video with side boards is displayed in a full mode.

If, for example, the selected event is video having an aspect ratio 16:9 that was produced by adding side panels SP to video having an aspect ratio 4:3, as shown in FIG. 2A the video having the aspect ratio 16:9 with the side panels SP is displayed on the screen DYP.

Figure 2B:
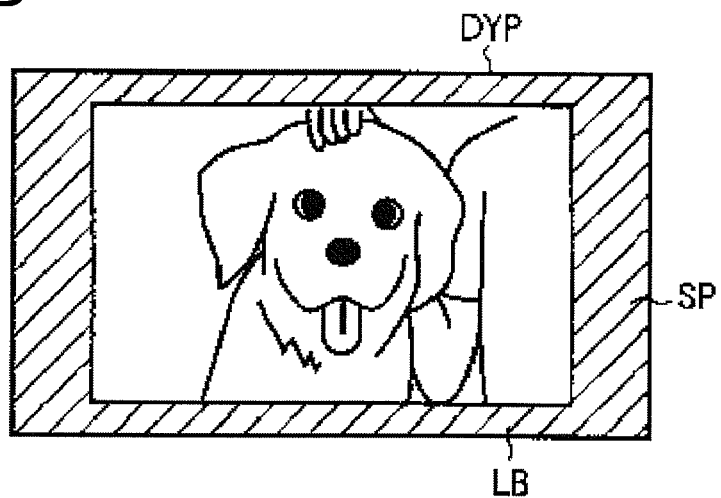
FIG. 2B shows an example of display in which video with side boards and letter boxes is displayed in the full mode.

If the selected event is video with side panels SP and letter boxes LB which has an aspect ratio 16:9, as shown in FIG. 2B the video with the side panels SP and the letter boxes LB which has the aspect ratio 16:9 is displayed on the screen DYP.

If the video size was switched previously for the selected event (step STA2), at step STA3 the video size switching module SW checks video sizes that are stored in the video size memory M so as to be correlated with respective events.

If the video size that is stored in the video size memory M as corresponding to the selected event is the full size (step STA4), the video size switching module SW determines at step STA5 that the video size that should be employed is the full size.

If the video size that is stored in the video size memory M as corresponding to the selected event is the HD super live size, the video size switching module SW determines at step STA6 that the video size that should be employed is the HD super live size.

Figure 2C:
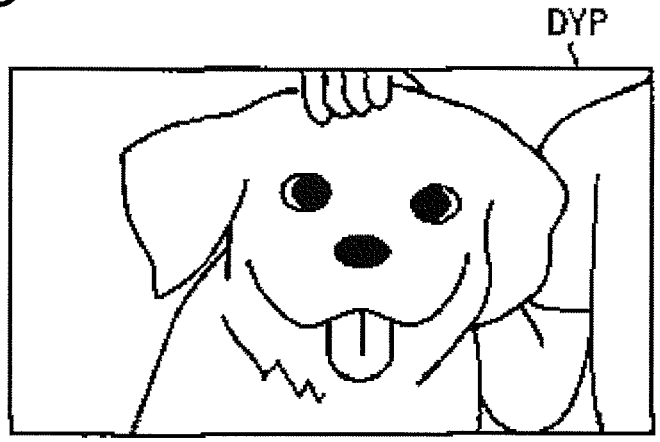
FIG. 2C shows an example of display in which video with side boards is displayed in an HD super live mode.

In this case, if the selected event is video having an aspect ratio 16:9 that was produced by adding side panels SP to video having an aspect ratio 4:3, as shown in FIG. 2C video obtained by removing the side panels SP is displayed after being processed so as to have an aspect ratio 16:9.

If the video size that is stored in the video size memory M as corresponding to the selected event is the HD zoom size, the video size switching module SW determines at step STA7 that the video size that should be employed is the HD zoom size.

Figure 2D:
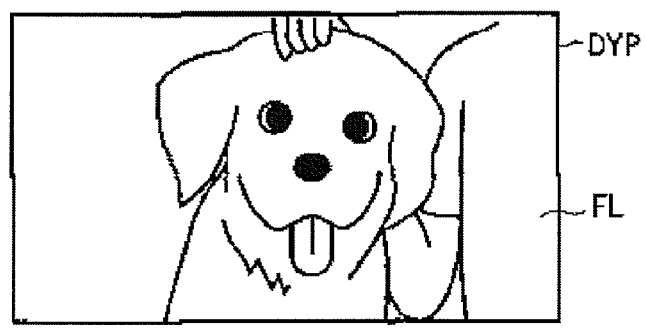
FIG. 2D shows an example of display in which video with side boards and letter boxes is displayed in an HD zoom mode.

In this case, if the selected event is video with side panels and letter boxes LB which has an aspect ratio 16:9, as shown in FIG. 2D video having an aspect ratio 16:9 obtained by removing the side panels SP and the letter boxes LB is displayed after being processed so as to have the aspect ratio 16:9.

Upon determination of the video size to be employed, the video size switching module SW determines at step STA8 whether it is different from the video size of the current display. If the video size to be employed is different from the video size of the current display, at step STA9 the video size switching module SW performs processing of changing the video size. If the video size to be employed is not different from the video size of the current display, the video size switching module SW does not perform the processing of changing the video size.

As described above, when the video size of video having an aspect ratio 16:9 is switched to the HS super live size or the HD zoom size, the video size switching module SW stores video size information in the video size memory M as corresponding to the event concerned. When this event is selected later, the video size information of the selected event stored in the video size memory M is referred to and switching is made to that video size.

By virtue of this measure, an event for which the user switched the video size once can always be viewed with the video size that was set previously (i.e., even if zapping is done). This saves the user time and layer for switching the video size mode.

It also becomes possible to avoid cutting away video-bearing side panel portions erroneously from true 16:9-aspect-ratio video which does not have side panels. Where video size mode setting information is stored in a nonvolatile memory and the video size mode is not returned to the full mode even if tuning is done, if the user wants to view a true 16:9-aspect-ratio video in the full mode after zapping, it is necessary to switch the video size two times, that is, when zapping is done and when a return is made form the zapping. In contrast, in the video processing apparatus and the video processing method according to the embodiment, the user need not perform a manipulation of switching the video size mode at the time of zapping and hence is saved time and labor for switching the video size mode.

That is, the video processing apparatus and the video processing method according to the embodiment can save the user time and labor in connection with the video size mode switching. An easy-to-use video processing apparatus and video signal method can thus be provided.

Next, a video processing apparatus and a video processing method according to a second embodiment of the invention will be described below with reference to the drawings. In the following description, components, steps, etc. having the same or corresponding components, steps, etc. in the video processing apparatus and the video processing method according to the first embodiment will be given the same reference symbols as the latter and will not be described.

As the above-described video processing apparatus according to the first embodiment, the video processing apparatus according to this embodiment is a digital TV broadcast receiver 11 shown in FIG. 1. A controller 65 is equipped with a video size switching module SW for changing the size of video to be displayed on the video display device 14 and a video size memory M which serves as a storing module for storing video sizes that are set for respective services (channels).

When a command to switch the video size is input by, for example, a manipulation on the remote controller 17, the video size switching module SW stores the thus-set video size in the video size memory M. For example, if a command to switch the video size to the HD super live size, the video size switching module SW stores, in the video size memory M, video size information which includes an event ID of a service for which the video size has been switched and the set video size.

When the user has tuned in, the video size switching module SW checks whether video size information of the selected service is stored in the video size memory M. If video size information of the selected service is stored in the video size memory M, the video size switching module SW causes display of video with the video size stored in the video size memory M.

For example, if a service is selected by the user and the video size of the selected service that is stored in the video size memory M is the HD super live size, the video size switching module SW causes display of the service selected by the user in the HD super live mode.

As described above, in the video processing apparatus according to the embodiment, pieces of information indicating video sizes to which switching was made for respective services rather than respective events are stored. There are services in which video with side panels is broadcast frequently and services in which video with side panels is not broadcast very frequently. Therefore, the video size is set to the HD super live size for services in which video with side panels is broadcast frequently and the video size is set to the full size for services in which video with side panels is not broadcast very frequently. This makes it possible to save the user time and labor in connection with the video size switching and to thereby increase the ease of use for the user.

Each service has a tendency in the display position of telops such as time or captions that are added to video. For example, there are services in which even in the case of true 16:9 video without side panels telops are added at a position outside the side panel portions and services in which even in the case of 16:9 video with side panels telops such as time are displayed so as to be superimposed on the side panels.

Since the user would desire such a video size control that video whose telops do not disappear partially even if side panel portions are cut away be viewed with the side panel portions removed and video whose telops disappear partially if side panel portions are cut away be viewed without removing the side panel portions, storing pieces of video size information for respective services makes it possible to save the user time and labor for switching the video size every time tuning is done and to thereby increase the ease of use for the user.

Next, a description will be made of an example video size control operation which utilizes service information. If a service is selected by, for example, the user's operation input to the remote controller 17, first the video size switching module SW checks at step STB1 whether the video size was switched previously for the selected service.

If the video size was not switched previously for the selected service (step STB2), at step STB5 the video size switching module SW determines that the video size that should be employed is the full size. If the video size was switched previously for the selected service (step STB2), at step STB3 the video size switching module SW checks video sizes that are stored in the video size memory M so as to be correlated with respective services.

If the video size that is stored in the video size memory M as corresponding to the selected service is the full size (step STB4), the video size switching module SW determines at step STB5 that the video size that should be employed is the full size. If the video size that is stored in the video size memory M as corresponding to the selected service is the HD super live size, the video size switching module SW determines at step STB6 that the video size that should be employed is the HD super live size. If the video size that is stored in the video size memory M as corresponding to the selected service is the HD zoom size, the video size switching module SW determines at step STB7 that the video size that should be employed is the HD zoom size.

Upon determination of the video size to be employed, the video size switching module SW determines at step STB8 whether it is different from the video size of the current display. If the video size to be employed is different from the video size of the current display, at step STB9 the video size switching module SW performs processing of changing the video size. If the video size to be employed is not different from the video size of the current display, the video size switching module SW does not perform the processing of changing the video size.

As described above, when the video size of video having an aspect ratio 16:9 is switched to the HD super live size or the HD zoom size, the video size switching module SW stores video size information in the video size memory M as corresponding to the service concerned. When this service is selected later, the video size information of the selected service stored in the video size memory M is referred to and switching is made to that video size.

Storing and controlling video sizes for respective services in the above-described manner makes it unnecessary to switch the video size every time tuning is done in the case where each service has a tendency in the broadcast video format (e.g., there are services in which video with side panels is broadcast frequently and services in which video with side panels is not broadcast very frequently) or each service has a tendency in the display position of telops added to video such as time or captions (e.g., there are services in which telops are partially displayed in side panel portions and services in which no telops are partially displayed in side panel portions).

That is, the video processing apparatus and the video processing method according to the embodiment can save the user time and labor in connection with the video size mode switching. An easy-to-use video processing apparatus and video signal method can thus be provided.

Next, a video processing apparatus and a video processing method according to a third embodiment of the invention will be described below with reference to the drawings.

As the above-described video processing apparatus according to the first embodiment, the video processing apparatus according to this embodiment is a digital TV broadcast receiver 11 shown in FIG. 1. A controller 65 is equipped with a video size switching module SW for changing the size of video to be displayed on the video display device 14 and the video size memory M which serves as a storing module for storing video sizes that are set for respective events (programs).

In the video size switching module SW, doing of tuning after video size switching is added as another condition for returning the video size to the full size. This will be described below in more detail. When the user wants to view consecutive events with the video size kept the HD super live size (e.g., when video with side panels is broadcast continuously over plural events), the user needs to switch the video size to the HD super live size every time a transition is made to the next event. This is very troublesome to the user.

In view of the above, in the video processing apparatus according to the embodiment, doing of tuning after video size switching is added as another condition for the video size switching module SW's returning the video size to the full size. With this control, the HD super live mode or the HD zoom mode is maintained over plural events unless tuning is done after switching of the video size. This saves the user time and labor for switching the video size every time the event changes and thereby increases the ease of use for the user.

Figure 6:
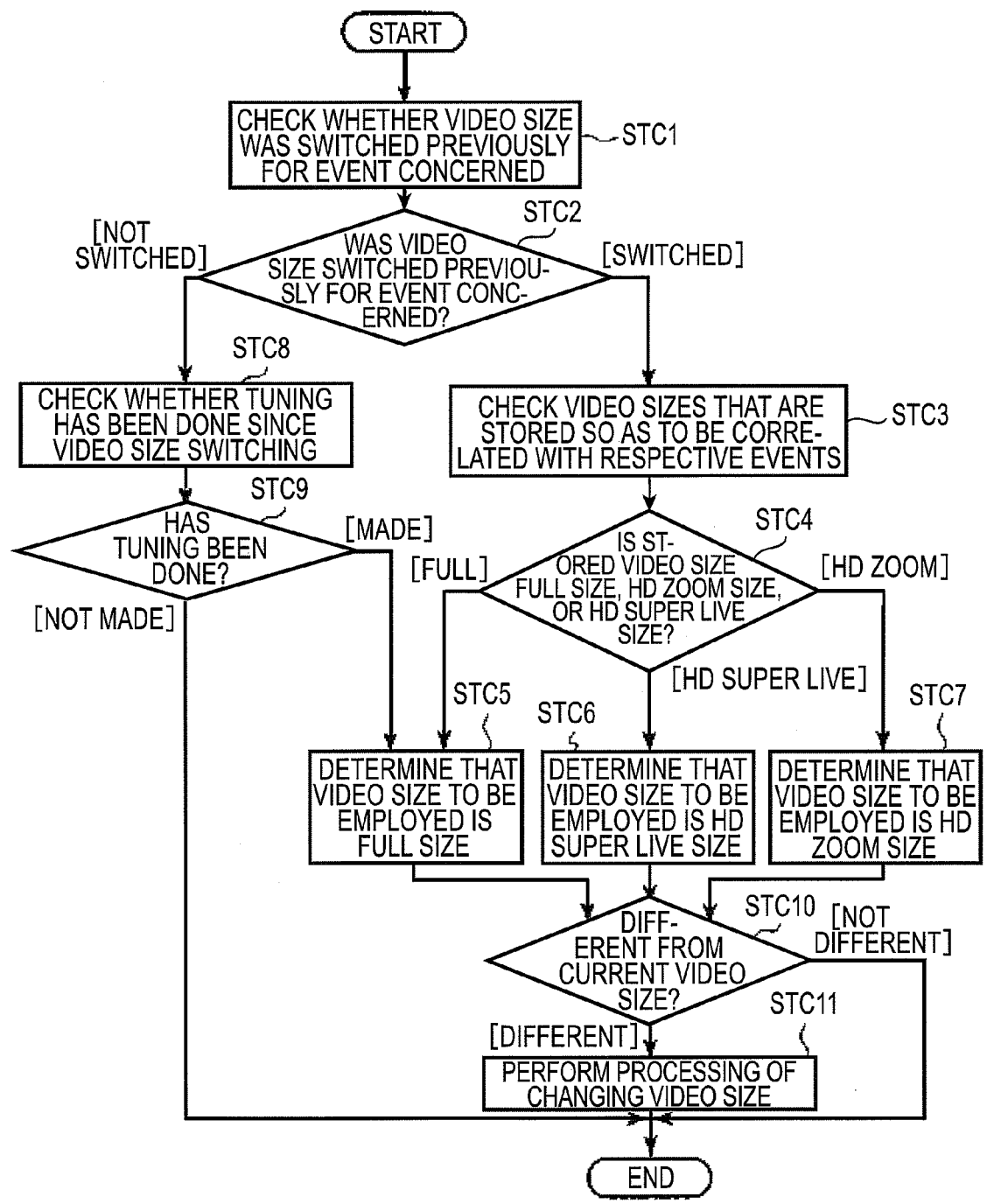
FIG. 6 is a flowchart showing an example video size switching control method in a video processing apparatus according to a third embodiment of the invention.

An example video size control operation of the video size switching module SW which includes determination as to whether tuning has been made since switching of the video size will be described below with reference to FIG. 6. Upon a start of an event, first, at step STC1, the video size switching module SW checks whether the event just started is an event for which the video size was switched previously.

If the event just started is an event for which the video size was not switched previously (step STC2), at step STC8 the video size switching module SW checks whether tuning has been made since switching of the video size. If tuning has been made since switching of the video size (step STC9), the video size switching module SW determines at step STC5 that the video size that should be employed is the full size. If tuning has not been made since switching of the video size, the video size switching module SW does nothing, that is, finishes the video size control process and maintains the current video size.

If the event just started is an event for which the video size was switched previously (step STC2), at step STC3 the video size switching module SW checks video sizes that are stored in the video size memory M so as to be correlated with respective events.

If the video size that is stored in the video size memory M as corresponding to the event concerned is the full size (step STC4), the video size switching module SW determines at step STC5 that the video size that should be employed is the full size. If the video size that is stored in the video size memory M as corresponding to the event concerned is the HD super live size, the video size switching module SW determines at step STC6 that the video size that should be employed is the HD super live size. If the video size that is stored in the video size memory M as corresponding to the event concerned is the HD zoom size, the video size switching module SW determines at step STC7 that the video size that should be employed is the HD zoom size.

Upon determination of the video size to be employed, the video size switching module SW determines at step STC10 whether it is different from the video size of the current display.

If the video size to be employed is different from the video size of the current display, at step STC11 the video size switching module SW performs processing of changing the video size. If the video size to be employed is not different from the video size of the current display, the video size switching module SW does not perform the processing of changing the video size.

As described above, in the video processing apparatus and the video processing method according to the embodiment, doing of tuning after video size switching is added as a condition for triggering a return of the video size to the full size. In the video processing apparatus and the video processing method according to the first embodiment, the video size is returned to the full size upon completion of an event for which the video size was switched.

Therefore, if the user wants to view consecutive events with side panels with the video size kept the HD super live size, the user needs to switch the video size to the HD super live size again when a transition is made to the next event.

In contrast, the video processing apparatus and the video processing method according to the embodiment can save the user time and labor for doing that because doing of tuning after video size switching is added as a condition for returning the video size to the full size.

That is, in the video processing apparatus and the video processing method according to the embodiment, the HD super live mode or the HD zoom mode is maintained over plural events unless tuning is done after switching of the video size. This saves the user time and labor for switching the video size every time the event changes.

As such, the video processing apparatus and the video processing method according to the embodiment can save the user time and labor in connection with the video size mode switching. An easy-to-use video processing apparatus and video signal method can thus be provided.

Next, a video processing apparatus and a video processing method according to a fourth embodiment of the invention will be described below with reference to the drawings. As the above-described video processing apparatus according to the first embodiment, the video processing apparatus according to this embodiment is a digital TV broadcast receiver 11 shown in FIG. 1. A controller 65 is equipped with a video size switching module SW for changing the size of video to be displayed on the video display device 14 and the video size memory M which serves as a storing module for storing video sizes that are set for respective events (programs).

In the video size switching module SW of the video processing apparatus according to this embodiment, doing of tuning after completion of an event for which the video size was switched is added as another condition for returning the video size to the full size.

In the video processing apparatus according to the third embodiment, if zapping is done after switching of the video size, the video size is returned to the full size upon completion of an event for which the video size was switched though the HD super live size is maintained during viewing of this event.

In contrast, determining whether tuning has been made since completion of an event for which the video size was switched makes it possible to maintain the HD super live mode or the HD zoom mode over plural events unless tuning is done after completion of the event. This saves the user time and labor for switching the video size every time the event changes and thereby increases the ease of use for the user.

Figure 7:
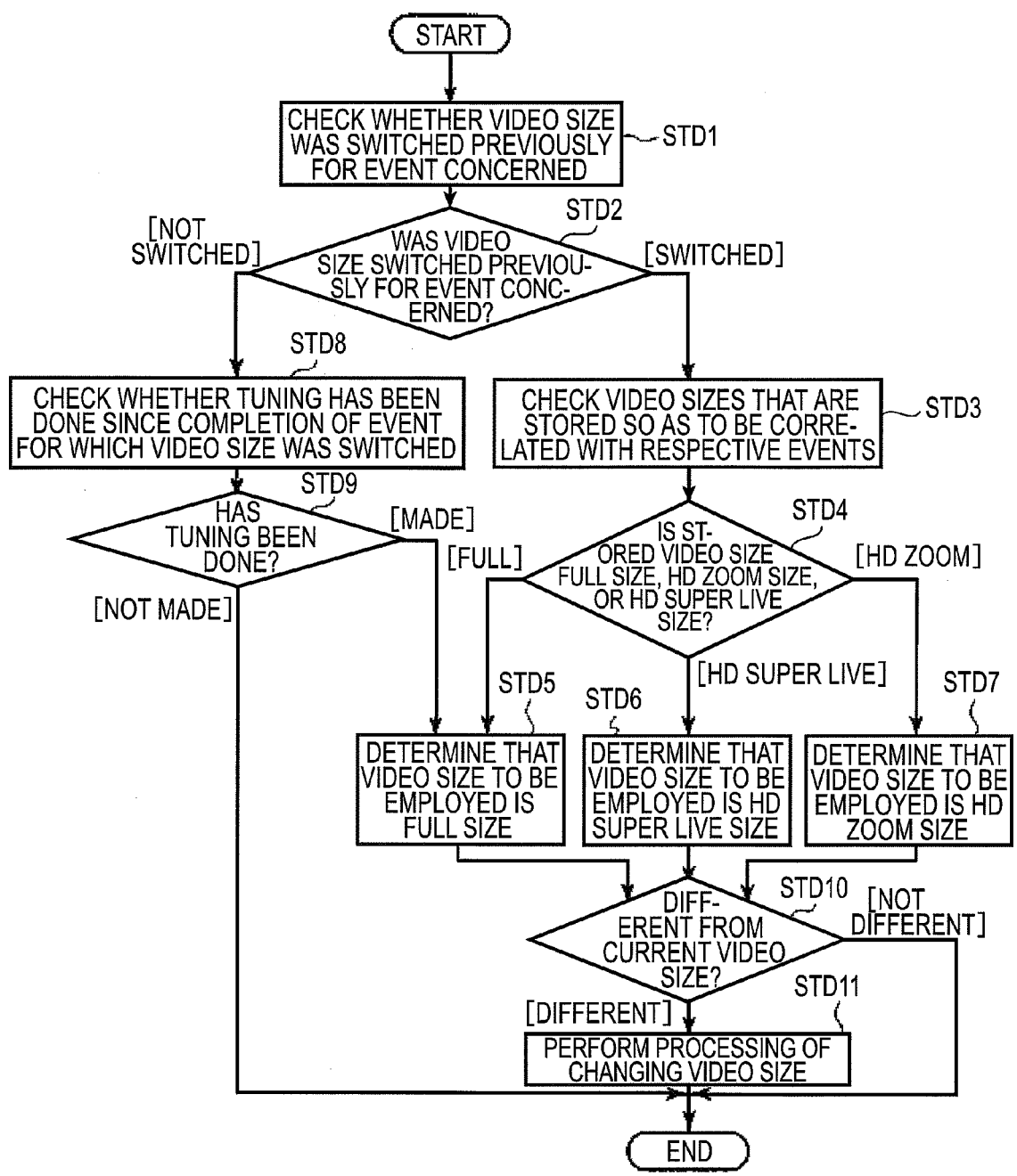
FIG. 7 is a flowchart showing an example video size switching control method in a video processing apparatus according to a fourth embodiment of the invention.

An example video size control operation of the video size switching module SW which includes determination as to whether tuning has been made since completion of an event for which the video size was switched will be described below with reference to FIG. 7. Upon a start of an event, first, at step STD1, the video size switching module SW checks whether the event for viewing is an event for which the video size was switched previously.

If the event for viewing is an event for which the video size was not switched previously (step STD2), at step STD8 the video size switching module SW checks whether tuning has been made since completion of an event for which the video size was switched.

If tuning has been made since completion of an event for which the video size was switched (step STD9), the video size switching module SW determines at step STD5 that the video size that should be employed is the full size. Also if no video size switching occurred, the video size switching module SW determines at step STD9 that tuning has been made since completion of an event for which the video size was switched.

If tuning has not been made since completion of an event for which the video size was switched (step STD9), the video size switching module SW does nothing, that is, finishes the video size control process and maintains the current video size.

If the event for viewing is an event for which the video size was switched previously (step STD2), at step STD3 the video size switching module SW checks video sizes that are stored in the video size memory M so as to be correlated with respective events.

If the video size that is stored in the video size memory M as corresponding to the event concerned is the full size (step STD4), the video size switching module SW determines at step STD5 that the video size that should be employed is the full size. If the video size that is stored in the video size memory M as corresponding to the event concerned is the HD super live size, the video size switching module SW determines at step STD6 that the video size that should be employed is the HD super live size. If the video size that is stored in the video size memory M as corresponding to the event concerned is the HD zoom size, the video size switching module SW determines at step STD7 that the video size that should be employed is the HD zoom size.

Upon determination of the video size to be employed, the video size switching module SW determines at step STD10 whether it is different from the video size of the current display. If the video size to be employed is different from the video size of the current display, at step STC11 the video size switching module SW performs processing of changing the video size. If the video size to be employed is not different from the video size of the current display, the video size switching module SW does not perform the processing of changing the video size.

As described above, in the video processing apparatus and the video processing method according to the embodiment, doing of tuning after completion of an event for which the video size was switched is added as another condition for triggering a return of the video size to the full size. In the video processing apparatus and the video processing method according to the third embodiment, if zapping is done even once after switching of the video size, the video size is returned to the full size upon completion of an event for which the video size was switched.

When the user wants to view consecutive events with the video size kept the HD super live size (e.g., when video with side panels which has an aspect ration 16:9 is broadcast continuously over plural events), the user needs to switch the video size to the HD super live size again when a transition is made to the next event.

In contrast, in the video processing apparatus and the video processing method according to the embodiment, doing of tuning after completion of an event for which the video size was switched is added as another condition for triggering a return of the video size to the full size. This makes it possible to prevent the phenomenon that the video size is returned to the full size upon completion of the event concerned, and thereby makes it unnecessary to switch the video size every time the event changes in the case where, for example, events with size panels occur consecutively.

As such, the video processing apparatus and the video processing method according to the embodiment can save the user time and labor in connection with the video size mode switching. An easy-to-use video processing apparatus and video signal method can thus be provided.

Next, a video processing apparatus and a video processing method according to a fifth embodiment of the invention will be described below with reference to the drawings. As the above-described video processing apparatus according to the first embodiment, the video processing apparatus according to this embodiment is a digital TV broadcast receiver 11 shown in FIG. 1. A controller 65 is equipped with a video size switching module SW for changing the size of video to be displayed on the video display device 14 and the video size memory M which serves as a storing module for storing video sizes that are set for respective events (programs).

In the video processing apparatus according to this embodiment, the video size switching module SW determines whether video for viewing is in a CM (commercial message) period (advertisement period) and for returning the video size to the full size if the video is in a advertisement period. For example, the determination as to whether video is in a advertisement period is made by a method of detecting a variation in the audio mode.

Even if main video of an event has side panels, CM video of the same event not necessarily has side panels. If the video size is set to the HD super live size to make it suitable for main video, side panel portions of CM video are also removed. If the side panel portions of the CM video also bear substantial information, part of the CM information is lost. This problem, that is, the loss of part of CM information, can be solved by determining whether video for viewing is in a advertisement period by detecting, for example, a variation in the audio mode and returning the video size to the full size if the video is in a advertisement period. This saves the user time and labor for switching the video size every time switching is made between main video and CM video, and thereby increases the ease of use for the user.

Figure 8:
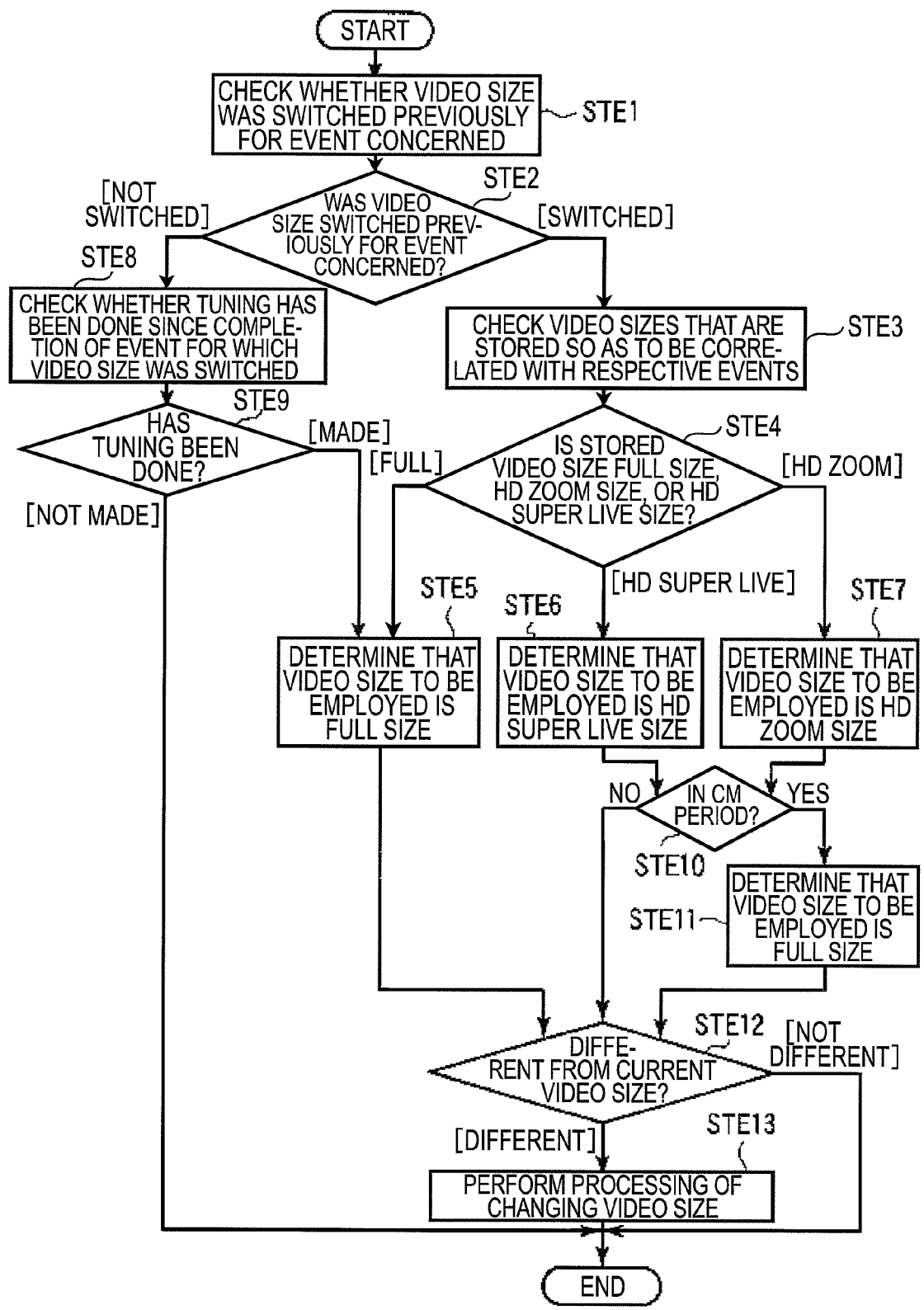
FIG. 8 is a flowchart showing an example video size switching control method in a video processing apparatus according to a fifth embodiment of the invention.

An example video size control operation in which the video size is automatically set to the full size during a CM will be described below with reference to FIG. 8. Upon a start of an event, first, at step STE1, the video size switching module SW checks whether the event for viewing is an event for which the video size was switched previously.

If the event for viewing is an event for which the video size was not switched previously (step STE2), at step STE8 the video size switching module SW checks whether tuning has been made since completion of an event for which the video size was switched.

If tuning has been made since completion of an event for which the video size was switched (step STE9), the video size switching module SW determines at step STE5 that the video size that should be employed is the full size. Also if no video size switching occurred, the video size switching module SW determines at step STE9 that tuning has been made since completion of an event for which the video size was switched. If tuning has not been made since completion of an event for which the video size was switched (step STE9), the video size switching module SW does nothing, that is, finishes the video size control process and maintains the current video size.

If the event for viewing is an event for which the video size was switched previously (step STE2), at step STE3 the video size switching module SW checks video sizes that are stored in the video size memory M so as to be correlated with respective events.

If the video size that is stored in the video size memory M as corresponding to the event concerned is the full size (step STE4), the video size switching module SW determines at step STE5 that the video size that should be employed is the full size. If the video size that is stored in the video size memory M as corresponding to the event concerned is the HD super live size, the video size switching module SW determines at step STE6 that the video size that should be employed is the HD super live size. If the video size that is stored in the video size memory M as corresponding to the event concerned is the HD zoom size, the video size switching module SW determines at step STE7 that the video size that should be employed is the HD zoom size.

If the video size that is stored in the video size memory M as corresponding to the event concerned is determined the HD super live size or the HD zoom size at step STE6 or STE7, the video size switching module SW further determines at step STE10 whether the event for viewing is in a advertisement period. If the event for viewing is determined in a advertisement period, at step STE11 the video size switching module SW sets the video size to be employed to the full size.

Upon determination of the video size to be employed, the video size switching module SW determines at step STE12 whether it is different from the video size of the current display.

If the video size to be employed is different from the video size of the current display, at step STE13 the video size switching module SW performs processing of changing the video size. If the video size to be employed is not different from the video size of the current display, the video size switching module SW does not perform the processing of changing the video size.

As described above, the video processing apparatus according to the embodiment is equipped with the video size control module for determining whether an event for viewing is in a advertisement period and for returning the video size to the full size if the event for viewing is in a advertisement period.

With this measure, the phenomenon that part of CM video information is lost while an event for viewing is in a advertisement period. Furthermore, the user is saved time and labor for switching the video size every time switching is made between main video and CM video.

That is, the video processing apparatus and the video processing method according to the embodiment can save the user time and labor in connection with the video size mode switching. An easy-to-use video processing apparatus and video signal method can thus be provided.

Next, a video processing apparatus and a video processing method according to a sixth embodiment of the invention will be described below with reference to the drawings. As the above-described video processing apparatus according to the first embodiment, the video processing apparatus according to this embodiment is a digital TV broadcast receiver 11 shown in FIG. 1. A controller 65 is equipped with a video size switching module SW for changing the size of video to be displayed on the video display device 14 and a video size memory M which serves as a storing module for storing video sizes that are set for respective events (programs) and other information.

In the video processing apparatus according to the embodiment, the video size switching module SW further has a means for setting, in advance, dates or days of the week and time slots during which to control the video size and for controlling the video size according to these settings. The dates or the days of the week and the time slots during which to control the video size and video sizes are stored in the video size memory M as video size information.

With this measure, the video size is switched automatically according to the time slot. Therefore, the user is saved time and labor for switching the video size according to the time slot and hence the ease of use for the user is increased. Service information may be set together with each piece of information of a date or a day of the week and a time slot during which to control the video size.

Figure 9:
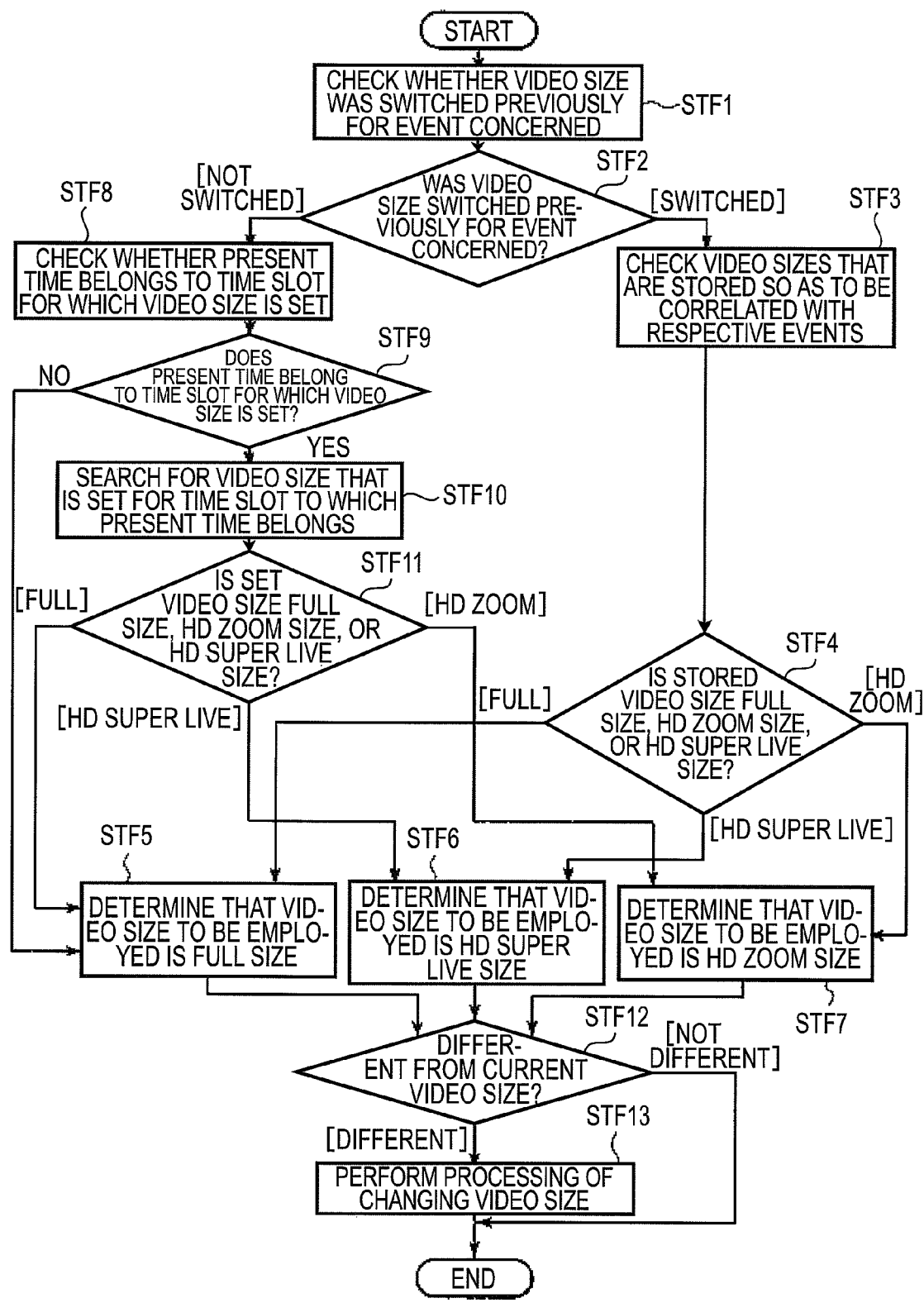
FIG. 9 is a flowchart showing an example video size switching control method in a video processing apparatus according to a sixth embodiment of the invention.

Next, an example video size control operation in which a time slot during which to control the video size will be described with reference to FIG. 9. If an event is selected by, for example, the user's operation input to the remote controller 17, first, at step STF1, the video size switching module SW checks whether the event for viewing is an event for which the video size was switched previously.

If the event for viewing is an event for which the video size was not switched previously (step STF2), at step STF8 the video size switching module SW checks whether the current time belongs to a time slot for which a video size is set. If the current time does not belong to a time slot for which a video size is set (step STF9), the video size switching module SW determines at step STF5 that the video size that should be employed is the full size.

If the current time belongs to a time slot for which a video size is set (step STF9), at step STF10 the video size switching module SW searches for a video size that is set for the time slot to which the current time belongs based on the video size information stored in the video size memory M.

If the image size that is stored in the video size memory M is the full size (step STF11), the video size switching module SW determines at step STF5 that the video size that should be employed is the full size. If the video size that is stored in the video size memory M is the HD super live size, the video size switching module SW determines at step STF6 that the video size that should be employed is the HD super live size. If the video size that is stored in the video size memory M is the HD zoom size, the video size switching module SW determines at step STF7 that the video size that should be employed is the HD zoom size.

If the event for viewing is an event for which the video size was switched previously (step STF2), at step STF3 the video size switching module SW checks video sizes that are stored in the video size memory M so as to be correlated with respective events. If the video size that is stored in the video size memory M as corresponding to the event concerned is the full size (step STF4), the video size switching module SW determines at step STF5 that the video size that should be employed is the full size. If the video size that is stored in the video size memory M as corresponding to the event concerned is the HD super live size, the video size switching module SW determines at step STF6 that the video size that should be employed is the HD super live size. If the video size that is stored in the video size memory M as corresponding to the event concerned is the HD zoom size, the video size switching module SW determines at step STF7 that the video size that should be employed is the HD zoom size.

Upon determination of the video size to be employed, the video size switching module SW determines at step STF12 whether it is different from the video size of the current display. If the video size to be employed is different from the video size of the current display, at step STF13 the video size switching module SW performs processing of changing the video size. If the video size to be employed is not different from the video size of the current display, the video size switching module SW does not perform the processing of changing the video size.

As described above, in the video processing apparatus and the video processing method according to the embodiment, time slots during which to control the video size are set. With this measure, the video size is switched automatically according to the time slot. Therefore, the user is saved time and labor for switching the video size according to the time slot.

That is, the video processing apparatus and the video processing method according to the embodiment can save the user time and labor in connection with the video size mode switching. An easy-to-use video processing apparatus and video signal method can thus be provided.

Next, a video processing apparatus and a video processing method according to a seventh embodiment of the invention will be described below with reference to the drawings. As the above-described video processing apparatus according to the first embodiment, the video processing apparatus according to this embodiment is a digital TV broadcast receiver 11 shown in FIG. 1. A controller 65 is equipped with a video size switching module SW for changing the size of video to be displayed on the video display device 14 and a video size memory M which serves as a storing module for storing video sizes that are set for respective events (programs).

In the video processing apparatus according to the embodiment, the video size switching module SW is provided with a module that performs a process for displaying an electronic program guide (EPG) that is acquired over a network or the like and for setting video sizes of events selected from the electronic program guide. The set video sizes are stored in the video size memory M together with respective event IDs.

Having the means for setting video sizes of events selected from an electronic program guide, the video size switching module SW can set, in advance, video sizes of event that will be broadcast in the future.

Figure 10:
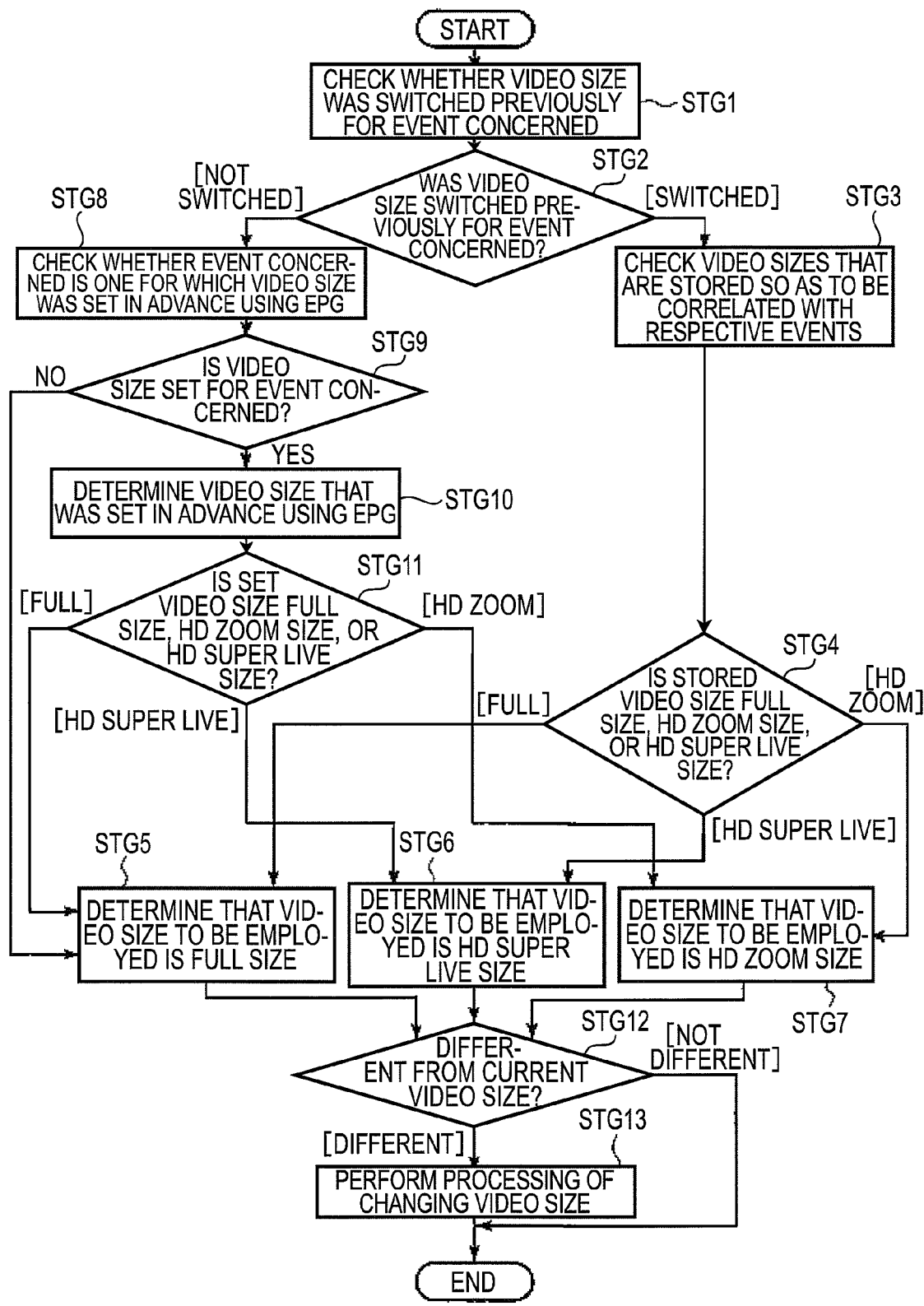
FIG. 10 is a flowchart showing an example video size switching control method in a video processing apparatus according to a seventh embodiment of the invention.

An example video size control operation will be described below with reference to FIG. 10. If an event is selected by, for example, the user's operation input to the remote controller 17, first, at step STG1, the video size switching module SW checks whether the event for viewing is an event for which the video size was switched previously.

If the event for viewing is an event for which the video size was not switched previously (step STG2), at step STG8 the video size switching module SW checks whether the event for viewing is an event for which a video size was set in advance using an electronic program guide. If the event for viewing is not an event for which a video size was set in advance using an electronic program guide (step STG9), the video size switching module SW determines at step STG5 that the video size that should be employed is the full size.

If the event for viewing is an event for which a video size was set in advance using an electronic program guide (step STG9), at step STG10 the video size switching module SW determines a video size that was set for the event concerned using an electronic program guide and stored in the video size memory M in advance.

If the image size that is stored in the video size memory M is the full size (step STG11), the video size switching module SW determines at step STG5 that the video size that should be employed is the full size. If the video size that is stored in the video size memory M is the HD super live size, the video size switching module SW determines at step STG6 that the video size that should be employed is the HD super live size. If the video size that is stored in the video size memory M is the HD zoom size, the video size switching module SW determines at step STG7 that the video size that should be employed is the HD zoom size.

If the event for viewing is an event for which the video size was switched previously (step STG2), at step STG3 the video size switching module SW checks video sizes that are stored in the video size memory M so as to be correlated with respective events. If the video size that is stored in the video size memory M as corresponding to the event concerned is the full size (step STG4), the video size switching module SW determines at step STG5 that the video size that should be employed is the full size. If the video size that is stored in the video size memory M as corresponding to the event concerned is the HD super live size, the video size switching module SW determines at step STG6 that the video size that should be employed is the HD super live size. If the video size that is stored in the video size memory M as corresponding to the event concerned is the HD zoom size, the video size switching module SW determines at step STG7 that the video size that should be employed is the HD zoom size.

Upon determination of the video size to be employed, the video size switching module SW determines at step STG12 whether it is different from the video size of the current display. If the video size to be employed is different from the video size of the current display, at step STG13 the video size switching module SW performs processing of changing the video size. If the video size to be employed is not different from the video size of the current display, the video size switching module SW does not perform the processing of changing the video size.

As described above, in the video processing apparatus and the video processing method according to the embodiment, video sizes of events that are selected from an electronic program guide are set. This allows the user to set, in advance, video sizes that match his or her tastes for respective events that will be broadcast in the future. As a result, the user need not switch the video size during viewing of events.

That is, the video processing apparatus and the video processing method according to the embodiment can save the user time and labor in connection with the video size mode switching. An easy-to-use video processing apparatus and video signal method can thus be provided.

Next, a video processing apparatus and a video processing method according to an eighth embodiment of the invention will be described below with reference to the drawings. As the above-described video processing apparatus according to the first embodiment, the video processing apparatus according to this embodiment is a digital TV broadcast receiver 11 shown in FIG. 1. A controller 65 is equipped with a video size switching module SW for changing the size of video to be displayed on the video display device 14 and a video size memory M which serves as a storing module for storing video sizes that are set for respective events (programs).

In the video processing apparatus according to the embodiment, the video size switching module SW further has a means for setting video sizes for respective series. This allows the user to view the events of the same series such as a drama series with a video size that the user set in advance. The user is thus saved time and labor for setting a video size for each event.

Figure 11:
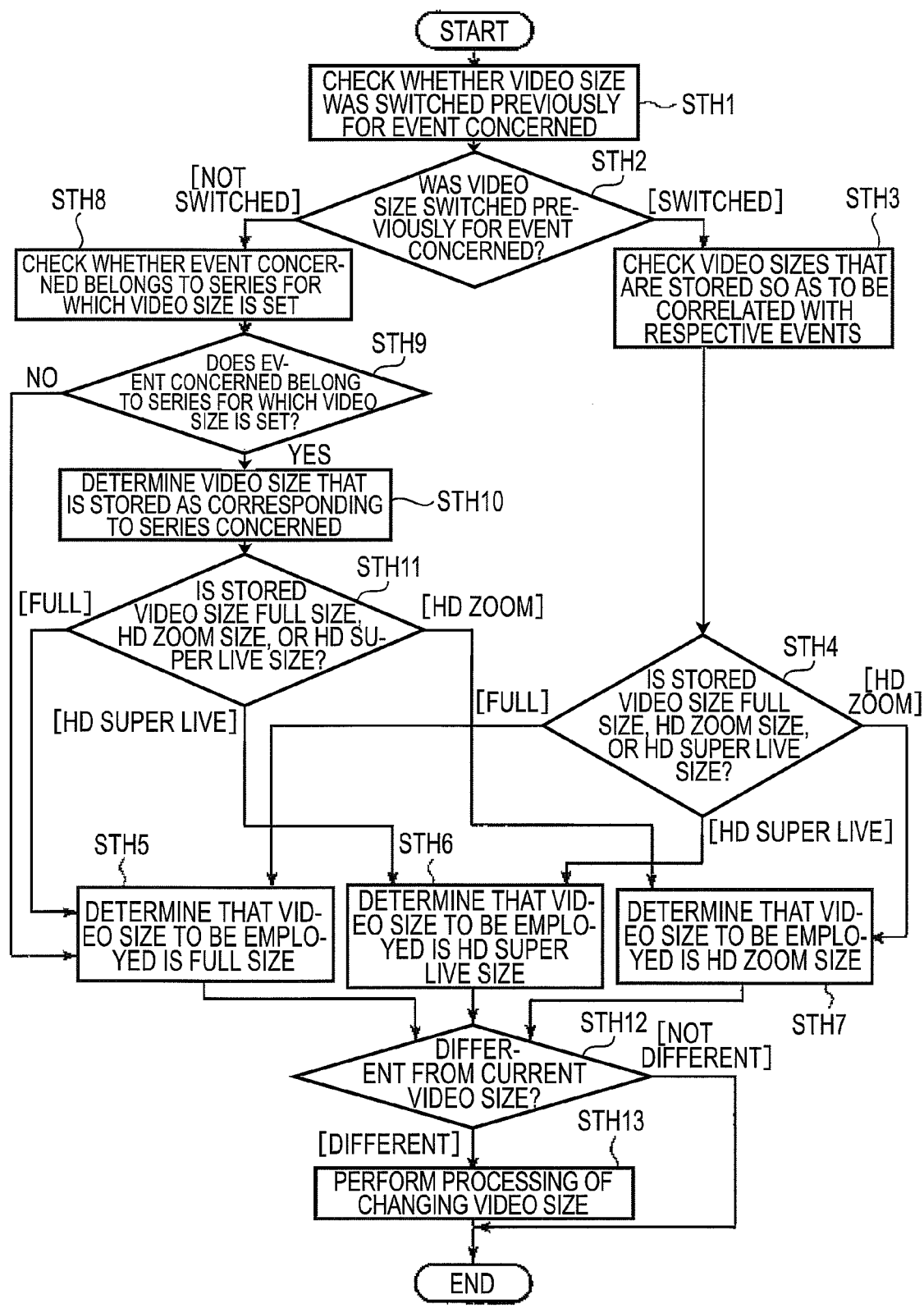
FIG. 11 is a flowchart showing an example video size switching control method in a video processing apparatus according to an eighth embodiment of the invention.

An example video size control operation will be described below with reference to FIG. 11. If an event is selected by, for example, the user's operation input to the remote controller 17, first, at step STH1, the video size switching module SW checks whether the event for viewing is an event for which the video size was switched previously.

If the event for viewing is an event for which the video size was not switched previously (step STH2), at step STH8 the video size switching module SW checks whether the event for viewing is a program that belongs to a series for which a video size is set. If the event for viewing is not a program that belong to a series for which a video size is set (step STH9), the video size switching module SW determines at step STH5 that the video size that should be employed is the full size.

If the event for viewing is a program that belongs to a series for which a video size is set (step STH9), at step STH10 the video size switching module SW determines a video size that is stored in the video size memory M as corresponding to the series concerned. If the image size that is stored in the video size memory M is the full size (step STH11), the video size switching module SW determines at step STH5 that the video size that should be employed is the full size.

If the video size that is stored in the video size memory M is the HD super live size, the video size switching module SW determines at step STH6 that the video size that should be employed is the HD super live size. If the video size that is stored in the video size memory M is the HD zoom size, the video size switching module SW determines at step STH7 that the video size that should be employed is the HD zoom size.

If the event for viewing is an event for which the video size was switched previously (step STH2), at step STH3 the video size switching module SW checks video sizes that are stored in the video size memory M so as to be correlated with respective events. If the video size that is stored in the video size memory M as corresponding to the event concerned is the lull size (step STH4), the video size switching module SW determines at step STH5 that the video size that should be employed is the full size.

If the video size that is stored in the video size memory M as corresponding to the event concerned is the HD super live size, the video size switching module SW determines at step STH6 that the video size that should be employed is the HD super live size. If the video size that is stored in the video size memory M as corresponding to the event concerned is the HD zoom size, the video size switching module SW determines at step STH7 that the video size that should be employed is the HD zoom size.

Upon determination of the video size to be employed, the video size switching module SW determines at step STH12 whether it is different from the video size of the current display. If the video size to be employed is different from the video size of the current display, at step STH13 the video size switching module SW performs processing of changing the video size. If the video size to be employed is not different from the video size of the current display, the video size switching module SW does not perform the processing of changing the video size.

As described above, in the video processing apparatus and the video processing method according to the embodiment, video sizes are set for respective series. This allows the user to view the events of the same series such as a drama series with a video size that the user set in advance. The user is thus saved time and labor for setting a video size for each event.

That is, the video processing apparatus and the video processing method according to the embodiment can save the user time and labor in connection with the video size mode switching. An easy-to-use video processing apparatus and video signal method can thus be provided.

Next, a video processing apparatus and a video processing method according to a ninth embodiment of the invention will be described below with reference to the drawings. As the above-described video processing apparatus according to the first embodiment, the video processing apparatus according to this embodiment is a digital TV broadcast receiver 11 shown in FIG. 1. A controller 65 is equipped with a video size switching module SW for changing the size of video to be displayed on the video display device 14 and a video size memory M which serves as a storing module for storing video sizes that are set for respective events (programs).

In the video processing apparatus according to the embodiment, the video size switching module SW further has a means for setting a video size for events that are listed by a search for a character string such as an event title. This allows the user to view the events having the same title or similar titles such as the events of a drama series with a video size that the user set in advance. The user is thus saved time and labor for setting a video size for each event.

Figure 12:
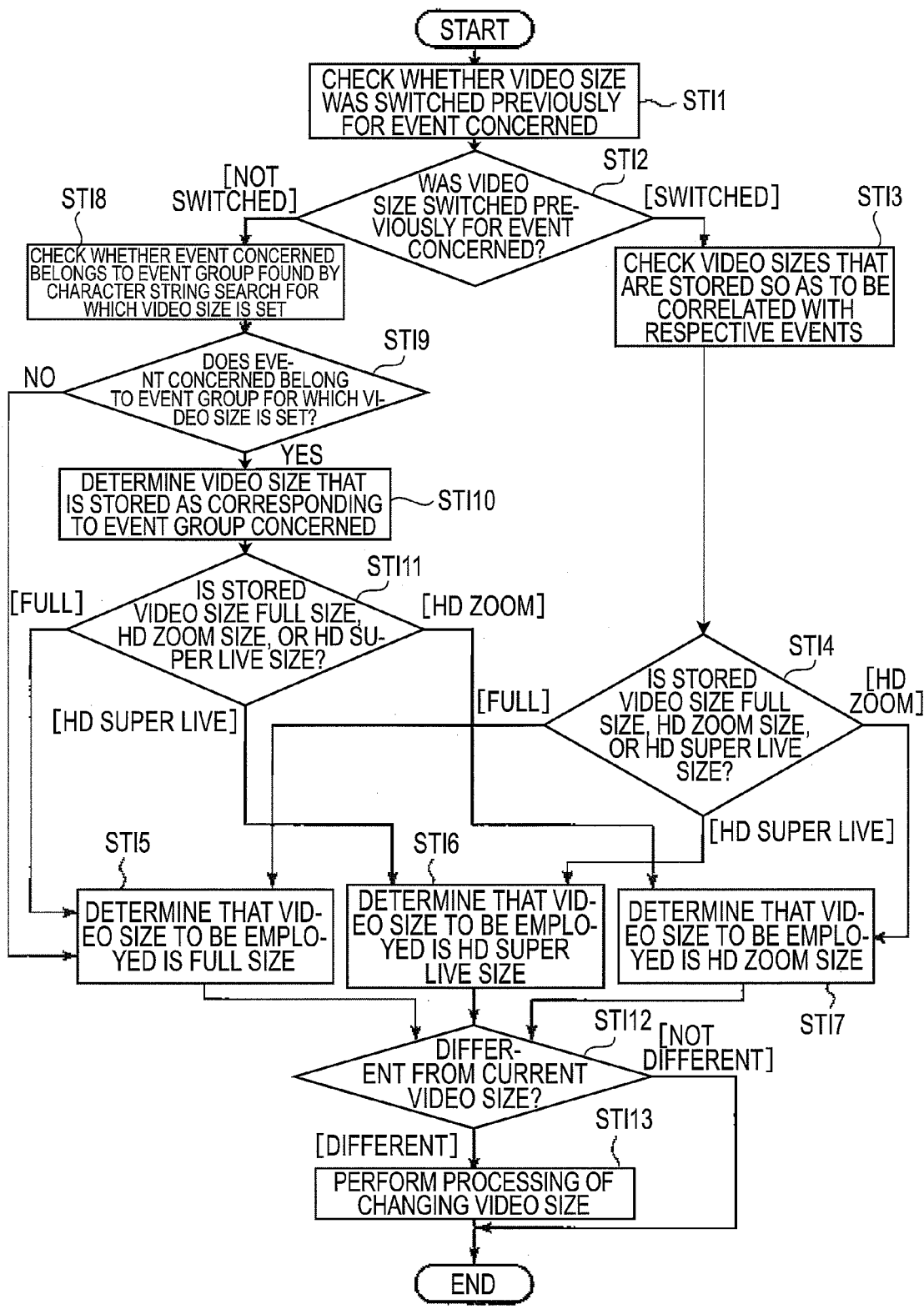
FIG. 12 is a flowchart showing an example video size switching control method in a video processing apparatus according to a ninth embodiment of the invention.

An example video size control operation will be described below with reference to FIG. 12. If an event is selected by, for example, the user's operation input to the remote controller 17, first, at step STI1, the video size switching module SW checks whether the event for viewing is an event for which the video size was switched previously.

If the event for viewing is an event for which the video size was not switched previously (step STI2), at step STI8 the video size switching module SW checks whether the event for viewing belongs to an event group found by a character string search for which a video size was set.

If the event for viewing does not belong to an event group found by a character string search for which a video size was set (step STI9), the video size switching module SW determines at step STI5 that the video size that should be employed is the full size.

If the event for viewing belongs to an event group found by a character string search for which a video size was set (step STI9), at step STI10 the video size switching module SW determines a video size that is stored in the video size memory M as corresponding to the event group found by the character string search.

If the image size that is stored in the video size memory M is the full size (step STI11), the video size switching module SW determines at step STI5 that the video size that should be employed is the full size. If the video size that is stored in the video size memory M is the HD super live size, the video size switching module SW determines at step STI6 that the video size that should be employed is the HD super live size. If the video size that is stored in the video size memory M is the HD zoom size, the video size switching module SW determines at step STI7 that the video size that should be employed is the HD zoom size.

If the event for viewing is an event for which the video size was switched previously (step STI2), at step STI3 the video size switching module SW checks video sizes that are stored in the video size memory M so as to be correlated with respective events. If the video size that is stored in the video size memory M as corresponding to the event concerned is the full size (step STI4), the video size switching module SW determines at step STI5 that the video size that should be employed is the full size. If the video size that is stored in the video size memory M as corresponding to the event concerned is the HD super live size, the video size switching module SW determines at step STI6 that the video size that should be employed is the HD super live size. If the video size that is stored in the video size memory M as corresponding to the event concerned is the HD zoom size, the video size switching module SW determines at step STI7 that the video size that should be employed is the HD zoom size.

Upon determination of the video size to be employed, the video size switching module SW determines at step STI12 whether it is different from the video size of the current display. If the video size to be employed is different from the video size of the current display, at step STI13 the video size switching module SW performs processing of changing the video size. If the video size to be employed is not different from the video size of the current display, the video size switching module SW does not perform the processing of changing the video size.

As described above, in the video processing apparatus and the video processing method according to the embodiment, a video size is set for events that are listed by a search for a character string such as an event title. This allows the user to view the events having the same title or similar titles such as the events of a drama series with a video size that the user set in advance. The user is thus saved time and labor for setting a video size for each event.

That is, the video processing apparatus and the video processing method according to the embodiment can save the user time and labor in connection with the video size mode switching. An easy-to-use video processing apparatus and video signal method can thus be provided.

Next, a video processing apparatus and a video processing method according to a 10th embodiment of the invention will be described below with reference to the drawings. As the above-described video processing apparatus according to the first embodiment, the video processing apparatus according to this embodiment is a digital TV broadcast receiver 11 shown in FIG. 1. A controller 65 is equipped with a video size switching module SW for changing the size of video to be displayed on the video display device 14 and a video size memory M which serves as a storing module for storing video sizes that are set for respective events (programs).

In the video processing apparatus according to the embodiment, the video size switching module SW has a means for storing, in the video size memory M, video sizes set for respective events in such a manner that they are coupled with pieces of event information (network IDs, service IDs, and event IDs) of the events.

To identify an event for which to set a video size, information for identifying a network over which the event will be broadcast, information for identifying a service to which the event belongs, and information for identifying the event in the service are necessary.

One method for storing video sizes for respective events is to provide video size information for each combination of a broadcast network ID, a service ID, and an event ID. However, the number of combinations of a broadcast network ID, a service ID, and an event ID is very large. It is enormous if events that are not broadcast currently are also included.

In view of the above, the video size switching module SW stores, in the video size memory M, event information (network ID/service ID/event ID) of an event for which a video size is set and the set video size in such a manner that they are coupled with each other. Storing event information and a video size in association with each other makes it possible to reduce the amount of memory used.

For example, event information of an event whose network ID, service ID, and event ID are "AAA," "BBB," and "CCC," respectively, is "AAA/BBB/CCC." For example, if a video size "HD super live" is set for this event, the event information "AAA/BBB/CCC" is stored at a certain storage location of the video size memory M and information indicating that the video size is "HD super live" is stored at the next storage location. The information indicating that the video size is "HD super live" may be an arbitrarily determined symbol, number, or character string.

Furthermore, in storing event information (network ID/service ID/event ID) of an event for which a video size has been set and the set video size in such a manner they are coupled with each other, the video size switching module SW gives higher priority to pieces of video size setting information that were stored later. More specifically, the number of data that can be stored in the video size memory M is set in advance and the oldest information is deleted if that number is exceeded when a new video size has been set. Setting the number of storable data in this manner makes it possible to reduce the amount of memory used.

Figure 13:
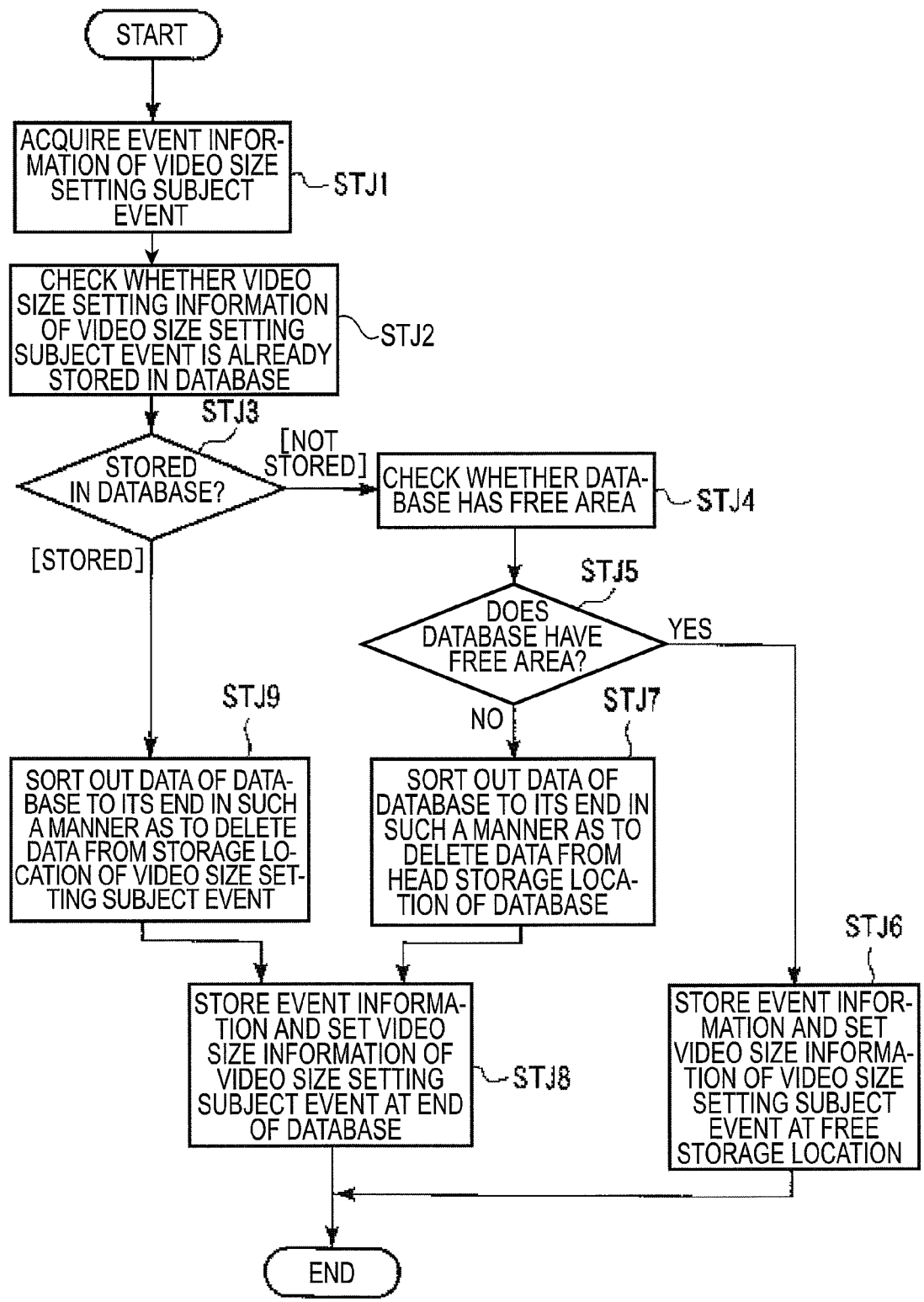
FIG. 13 is a flowchart showing an example video size setting information storing method in a video processing apparatus according to a 10th embodiment of the invention.

An example operation of storing video size setting information will be described below with reference to FIG. 13. First, at step STJ1, the video size switching module SW acquires event information (network ID/service ID/event ID) of an event for which a video size is to be set (video size setting subject event).

At step STJ2, the video size switching module SW checks whether the video size setting information of the video size setting subject event is already stored in a video size setting database of the video size memory M. If the video size setting information of the video size setting subject event is already stored in the video size setting database (step STJ3), at step STJ9 the video size switching module SW sorts out the data of the database to its end in such a manner as to delete the data from the storage location of the video size setting subject event.

Upon completion of the data sorting-out processing, at step STJ8 the video size switching module SW stores the event information and set video size information of the video size setting subject event at the end of the video size setting database.

If the video size setting information of the video size setting subject event is not stored in the video size setting database yet (step STJ3), at step STJ4 the video size switching module SW checks whether the video size setting database has a free area.

If the video size setting database has a free area (step STJ5), at step STJ6 the video size switching module SW stores the event information and the set video size information of the video size setting subject event at a free storage location of the database.

If the video size setting database does not have a free area (step STJ5), at step STJ the video size switching module SW sorts out the data of the database to its end in such a manner as to delete the data from the head storage location of the database. At step STJ8, the video size switching module SW stores the event information and the set video size information of the video size setting subject event at the end of the database.

Although the data is deleted from the head of the database, this information is oldest among all the data stored in the database. In the video processing apparatus and the video processing method according to the embodiment, pieces of information that have been stored lately and are necessary to the user are deleted at as low a probability as possible by deleting the oldest information.

As described above, in the video processing apparatus and the video processing method according to the embodiment, pieces of event information (network IDs/service IDs/event IDs) of events for which video sizes have been set and the set video sizes are stored in such a manner that the former are coupled with the latter one to one.

Furthermore, in storing event information (network ID/service ID/event ID) of an event for which a video size has been set and the set video size in such a manner they are coupled with each other, the video size switching module SW deletes the oldest information if the number of storable data is exceeded. With this measure, whereas pieces of information that have been set lately are protected, old pieces of video size information are deleted automatically as new video sizes are set. This saves the user time and labor for examining pieces of video size setting information and deleting one of them.

That is, the video processing apparatus and the video processing method according to the embodiment can save the user time and labor in connection with the video size mode switching. An easy-to-use video processing apparatus and video signal method can thus be provided.

Next, a video processing apparatus and a video processing method according to an 11th embodiment of the invention will be described below with reference to the drawings. As the above-described video processing apparatus according to the first embodiment, the video processing apparatus according to this embodiment is a digital TV broadcast receiver 11 shown in FIG. 1. A controller 65 is equipped with a video size switching module SW for changing the size of video to be displayed on the video display device 14 and a video size memory M which serves as a storing module for storing video sizes that are set for respective events (programs).

In the video processing apparatus according to the embodiment, the video size switching module SW has a means for storing, in the video size memory M, video sizes set for respective events in such a manner that they are coupled with pieces of event information (network IDs, service IDs, and event IDs) of the events.

In the video processing apparatus according to the embodiment, the video size switching module SW also has a means for deleting pieces of video size setting information of events that have already finished before event information of an event for which a video size has been set and the set video size are stored in such a manner that they are coupled with each other. With this measure, the video processing apparatus and the video processing method according to the embodiment reduce the amount of memory used.

In the video processing apparatus according to the 10th embodiment, pieces of video size setting information of events that have already finished may be left stored in the vide size memory M. In this case, the number of storable pieces of video size information of events that are being broadcast currently or will be broadcast in the future is reduced by the number of pieces of video size setting information of events that have already finished.

In view of the above, in the video processing apparatus and a video processing method according to the embodiment, the video size switching module SW has the means for deleting pieces of video size setting information of events that have already finished before event information of an event for which a video size has been set and the set video size are stored in such a manner that they are coupled with each other.

Figure 14:
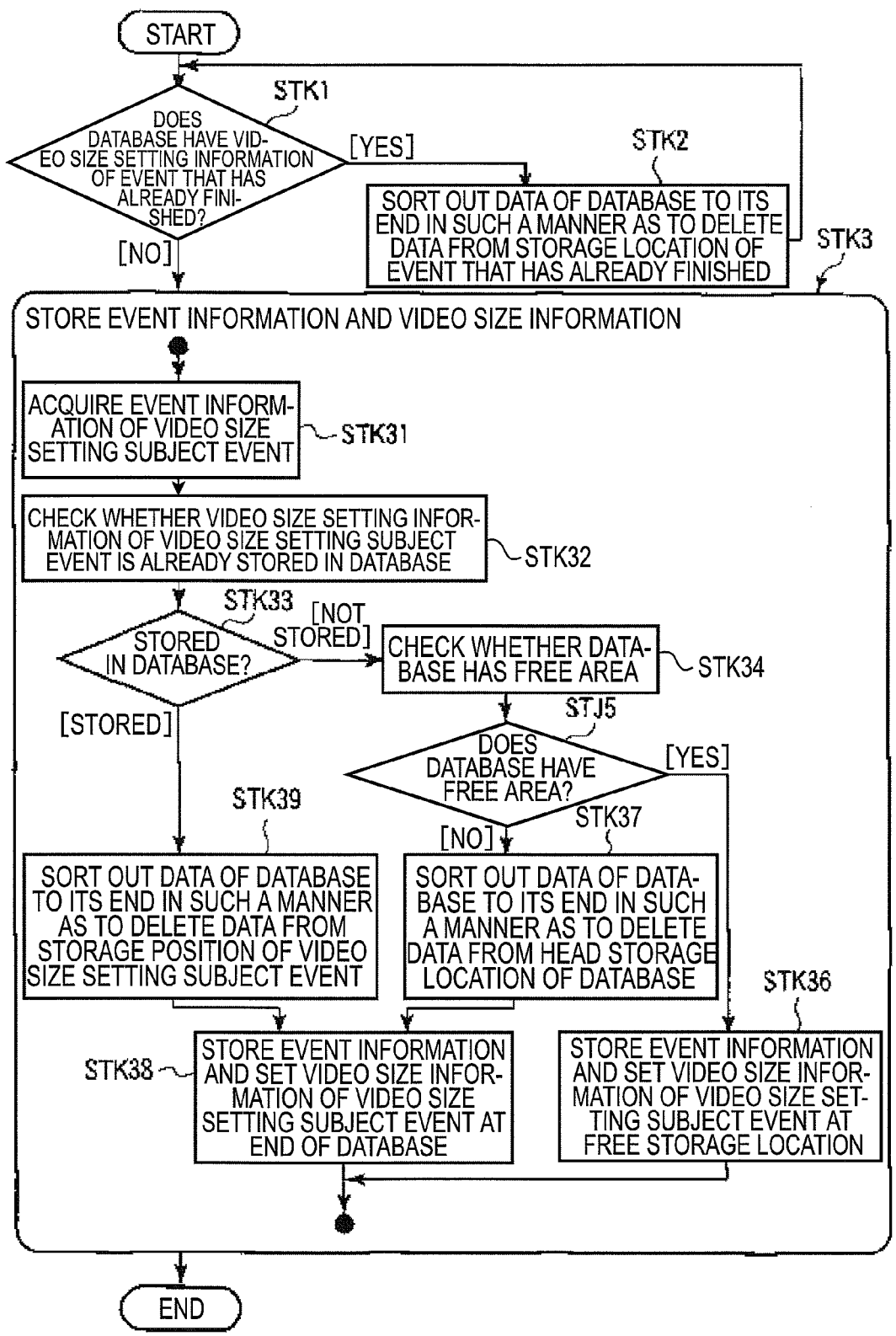
FIG. 14 is a flowchart showing an example video size setting information storing method in a video processing apparatus according to an 11th embodiment of the invention.

An example operation of storing video size setting information will be described below with reference to FIG. 14. First, at step STK1, the video size switching module SW checks whether the video size setting database of the video size memory M has video size setting information of an event that has already finished.

If the video size setting database does not have video size setting information of any event that has already finished, the video size switching module SW moves to step STK3, where it executes the above-described process according to the 10th embodiment of storing event information and video size information.

If the video size setting database has video size setting information of an event that has already finished, at step STK2 the video size switching module SW sorts out the data of the video size setting database to its end in such a manner as to delete the data from the storage location of the video size setting information of the event (or each event) that has already finished.

The video size switching module SW performs the above sorting-out processing until the video size setting database comes not to have video size setting information of any event that has already finished. The video size switching module SW executes the above-described process according to the 10th embodiment of storing event information and video size information (step STK3) if the video size setting database comes not to have video size setting information of any event that has already finished.

As described above, in the video processing apparatus and the video processing method according to the embodiment, the video size setting information of events that have already finished are deleted before event information of an event for which a video size has been set and the set video size are stored so as to be coupled with each other.

This makes it possible to reduce the amount of memory used and to prevent the phenomenon that the number of storable pieces of storable pieces of video size setting information of events that are being broadcast currently or will be broadcast in the future is reduced by continuing to store pieces of video size setting information of events that have already finished.

That is, the video processing apparatus and the video processing method according to the embodiment can save the user time and labor in connection with the video size mode switching. An easy-to-use video processing apparatus and video signal method can thus be provided.

Next, a video processing apparatus and a video processing method according to a 12th embodiment of the invention will be described below with reference to the drawings. As the above-described video processing apparatus according to the first embodiment, the video processing apparatus according to this embodiment is a digital TV broadcast receiver 11 shown in FIG. 1. A controller 65 is equipped with a video size switching module SW for changing the size of video to be displayed on the video display device 14 and a video size memory M which serves as a storing module for storing video sizes that are set for respective events (programs).

Figure 3A:
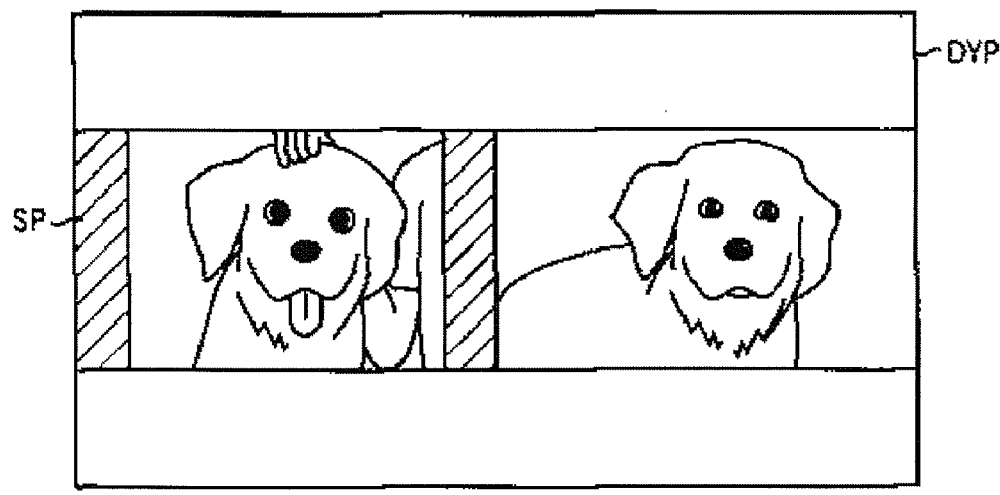
FIG. 3A shows an example of display in which video is displayed in a two-picture full mode.
Figure 3B:
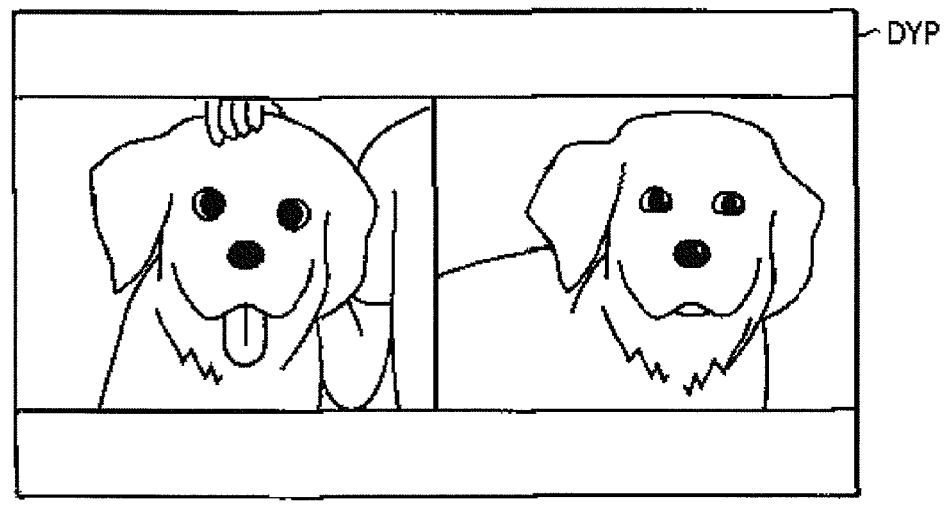
FIG. 3B shows an example of display in which video is displayed in a two-picture side-cut mode.

The controller 65 is provided with a module that performs a process for displaying a received event in the form of two pictures, and the video size switching module SW has a video size control module for switching the video size also in a two-picture mode. A video processing apparatus capable of display in the two-picture mode can operate in a full mode in which to display video having an aspect ratio 16:9 as shown in FIG. 3A and in a side-cut mode in which to display central video by cutting away side panel portions SP of 16:9 video as shown in FIG. 3B.

In general, when true 16:9 video without side panels is displayed in a one-picture mode, full display is preferred in which the aspect ratio is not changed. However, in the two-picture mode in which two pictures are arranged side by side, objects can be displayed larger when the side panel portions SP are cut away. Therefore, in the two-picture mode, not only a 16:9 vide with side panels but also true video without side panels may be displayed in the side-cut mode by cutting away the side panel portions as shown in FIG. 3B.

Figure 15:
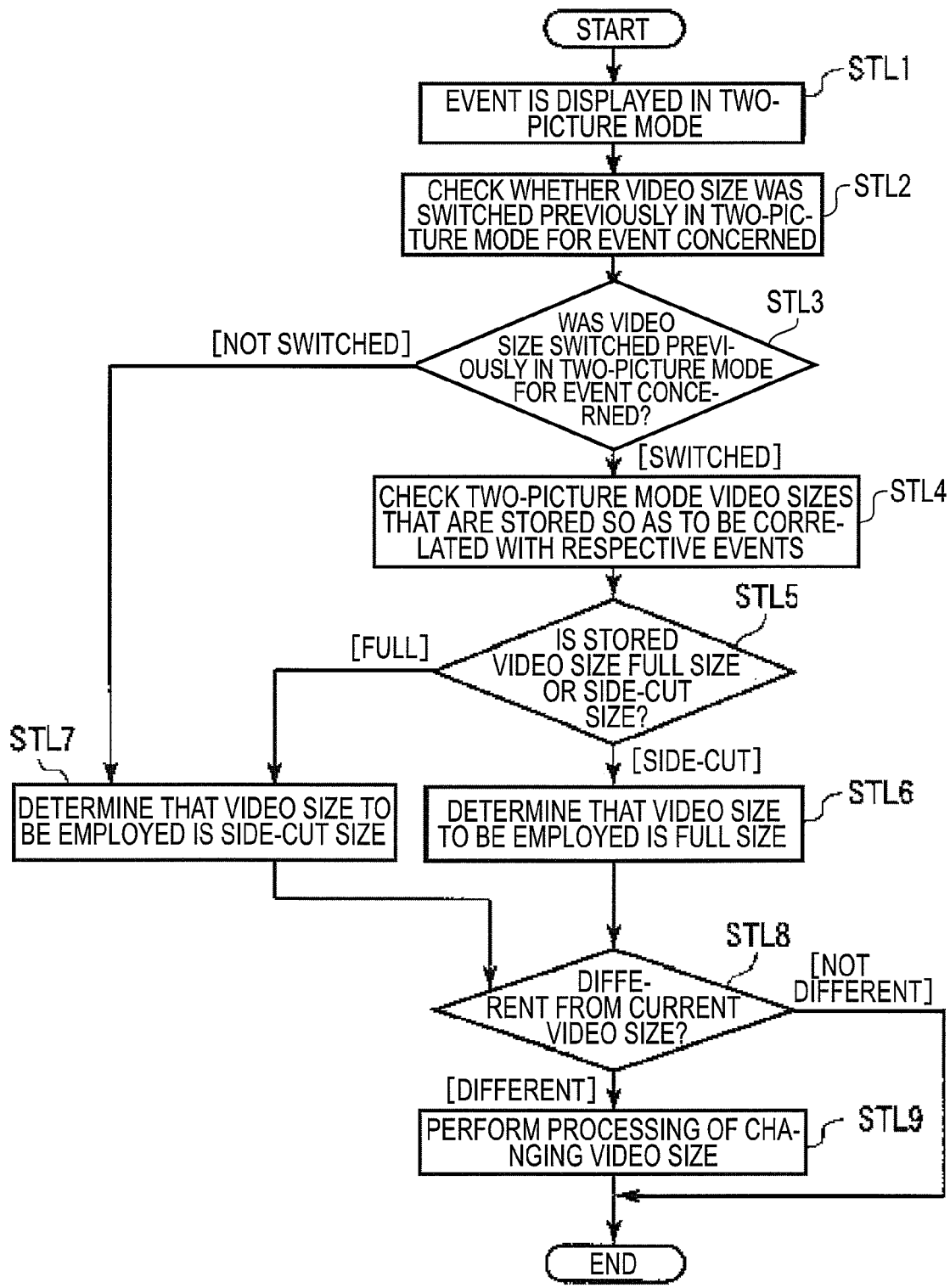
FIG. 15 is a flowchart showing an example video size switching control method in a video processing apparatus according to a 12th embodiment of the invention.

An example video size control operation in a case that an event is displayed in the two-picture mode will be described below with reference to FIG. 15. First, if an even is displayed in the two-picture mode (step STL1), at step STL2 the video size switching module SW checks whether the video size was switched previously in the two-picture mode for the event being viewed.

If the video size was not switched previously for the event being viewed (step STL3), at step STL6 the video size switching module SW determines that the video size that should be employed is the full size. If the video size was switched previously for the event being viewed (step STL3), at step STL4 the video size switching module SW checks video sizes that are stored in the video size memory M so as to be correlated with respective events.

If the video size that is stored in the video size memory M as corresponding to the event concerned is the full size (step STL5), the video size switching module SW determines at step STL6 that the video size that should be employed is the full size. If the video size that is stored in the video size memory M as corresponding to the event concerned is the side-cut size (step STL5), the video size switching module SW determines at step STL7 that the video size that should be employed is the side-cut size.

Upon determination of the video size to be employed, the video size switching module SW determines at step STL8 whether it is different from the video size of the event being viewed. If the video size to be employed is different from the video size of the event being viewed, at step STL9 the video size switching module SW performs processing of changing the video size. If the video size to be employed is not different from the video size being viewed, the video size switching module SW does not perform the processing of changing the video size.

By virtue of the above-described video size switching control, even for events to be displayed in the two-picture mode, the video size can be switched for each event in the same manner as in the video processing apparatus and the video processing method according to the first embodiment.

That is, the video processing apparatus and the video processing method according to the embodiment can save the user time and labor in connection with the video size mode switching. An easy-to-use video processing apparatus and video signal method can thus be provided.

The video processing apparatus and the video processing method according to the embodiment is such that the video processing apparatus and the video processing method according to the first embodiment is applied to a video processing apparatus and a video processing method capable of display in the two-picture mode. It is likewise possible to apply each of the video processing apparatus and the video processing methods according to the second to 11th embodiments to a video processing apparatus and a video processing method capable of display in the two-picture mode. Also in this case, the same advantages as obtained by each of the video processing apparatus and the video processing methods according to the second to 11th embodiments can be obtained.

Next, a video processing apparatus and a video processing method according to a 13th embodiment of the invention will be described below with reference to the drawings. As the above-described video processing apparatus according to the first embodiment, the video processing apparatus according to this embodiment is a digital TV broadcast receiver 11 shown in FIG. 1. A controller 65 is equipped with a video size switching module SW for changing the size of video to be displayed on the video display device 14 and a video size memory M which serves as a storing module for storing video sizes that are set for respective events (programs).

The controller 65 is provided with a module that performs a process for displaying a received event in the form of two pictures, and the video size switching module SW has a video size control module for switching the video size also in the two-picture mode. The video size control module of the video size switching module SW causes an event whose video size is set in the HD super live size or the HD zoom size in the one-picture mode to be displayed in the side-cut size in the two-picture mode. This is because selection of the HD super live size or the HD zoom size in the one-picture mode means that no problems are raised even if side panel portions are cut away also in the two-picture mode.

In the two-picture mode in which two pictures are arranged side by side, objects can be displayed larger when side panel portions are cut away. Therefore, cutting away side portions automatically can reduce the frequency of video size switching manipulations of the user.

Figure 16:
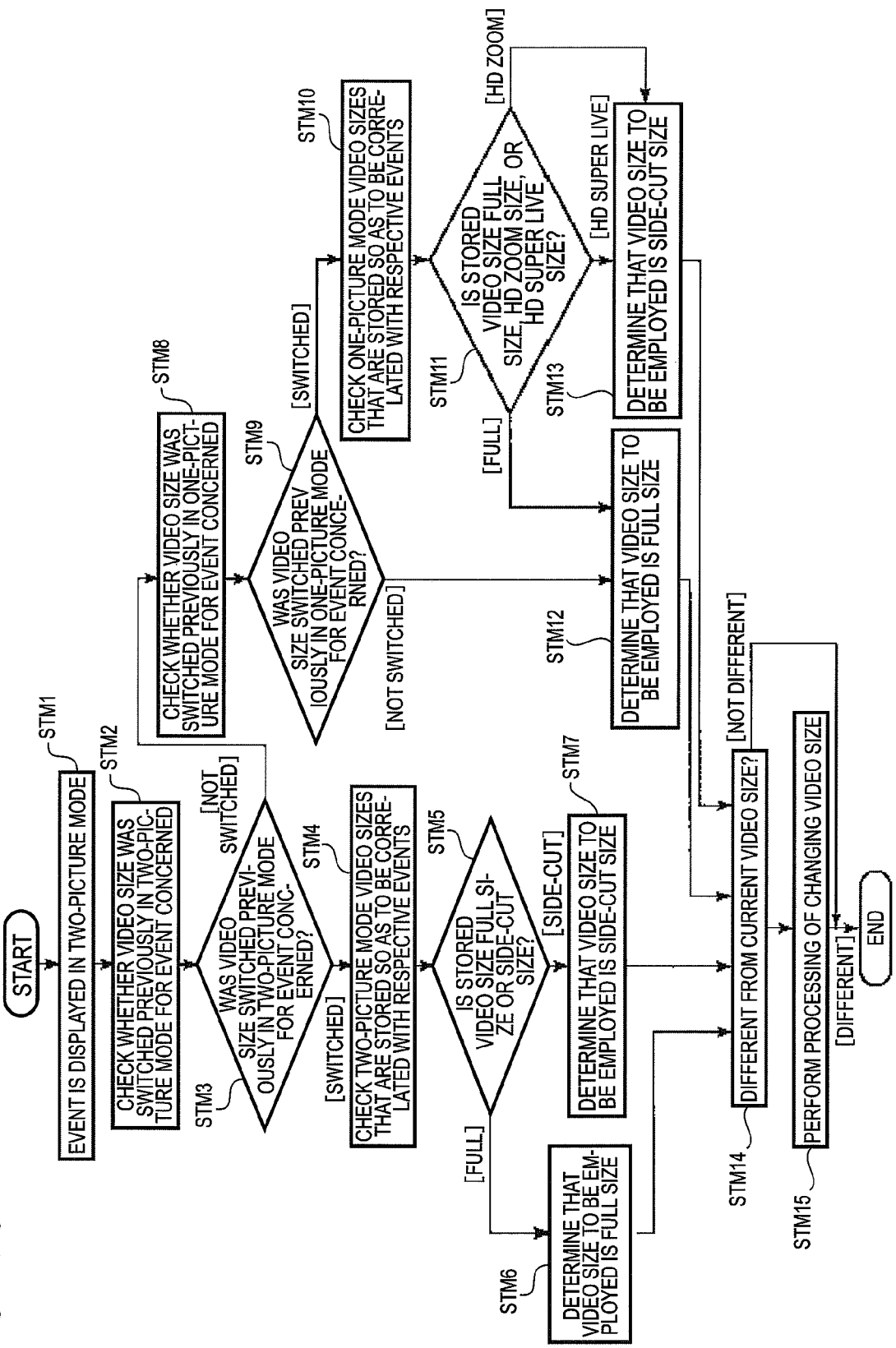
FIG. 16 is a flowchart showing an example video size switching control method in a video processing apparatus according to a 13th embodiment of the invention.

An example video size control operation will be described below with reference to FIG. 16. First, if an even is displayed in the two-picture mode (step STM1), at step STM2 the video size switching module SW checks whether the video size was switched previously in the two-picture mode for the event being viewed.

If the video size was not switched previously for the event being viewed (step STM3), at step STM8 the video size switching module SW checks whether the video size was switched previously in the one-picture mode for the event being viewed.

If the video size was not switched previously in the one-picture mode for the event being viewed (step STM9), at step STM12 the video size switching module SW determines that the video size that should be employed is the full size. If the video size was switched previously in the one-picture mode for the selected event (step STA9), at step STM10 the video size switching module SW checks one-picture mode video sizes that are stored in the video size memory M so as to be correlated with respective events. If the one-picture mode video size that is stored in the video size memory M as corresponding to the event concerned is the full size (step STM11), the video size switching module SW determines at step STM12 that the video size that should be employed is the full size. If the one-picture mode video size that is stored in the video size memory M as corresponding to the event concerned is the HD super live size or the HD zoom size (step STM11), the video size switching module SW determines at step STM13 that the video size that should be employed is the side-cut size.

If the video size was switched previously in the two-picture mode for the event being viewed (step STM3), at step STM4 the video size switching module SW checks two-picture mode video sizes that are stored in the video size memory M so as to be correlated with respective events. If the two-picture mode video size that is stored in the video size memory M as corresponding to the event concerned is the full size (step STM5), the video size switching module SW determines at step STM6 that the video size that should be employed is the full size. If two-picture mode the video size that is stored in the video size memory M as corresponding to the event concerned is the side-cut size (step STM5), the video size switching module SW determines at step STM7 that the video size that should be employed is the side-cut size.

Upon determination of the video size to be employed, the video size switching module SW determines at step STM14 whether it is different from the video size of the event being viewed. If the video size to be employed is different from the video size of the event being viewed, at step STM15 the video size switching module SW performs processing of changing the video size. If the video size to be employed is not different from the video size being viewed, the video size switching module SW does not perform the processing of changing the video size.

As described above, in the video processing apparatus and the video processing method according to the embodiment, in the two-picture mode, pieces of one-picture mode video size information are reflected in controlling the two-picture mode video size. This makes it unnecessary for the user to make a video size switching manipulation again when the display mode is switched from the one-picture mode to the two-picture mode.

That is, the video processing apparatus and the video processing method according to the embodiment can save the user time and labor in connection with the video size mode switching. An easy-to-use video processing apparatus and video signal method can thus be provided.

Next, a video processing apparatus and a video processing method according to a 14th embodiment of the invention will be described below with reference to the drawings. As the above-described video processing apparatus according to the first embodiment, the video processing apparatus according to this embodiment is a digital TV broadcast receiver 11 shown in FIG. 1. A controller 65 is equipped with a video size switching module SW for changing the size of video to be displayed on the video display device 14 and a video size memory M which serves as a storing module for storing video sizes that are set for respective events (programs).

The controller 65 is provided with a module that performs a process for displaying a received event in the form of two pictures, the video size switching module SW has a video size control module for switching the video size also in the two-picture mode, and a means for employing, in the two-picture mode, a video size for a case that no video size switching was made (i.e., an initial video size setting) as well as a video size that is set so as to be correlated with each event.

The side-cut size can be set as an initial video size setting of the two-picture mode. As a result, where the user wants video to be displayed basically in the side-cut size in the two-picture mode, the frequency of video size switching manipulations made in the two-picture mode can be reduced. The initial video size setting is stored in the video size memory M.

Figure 17:
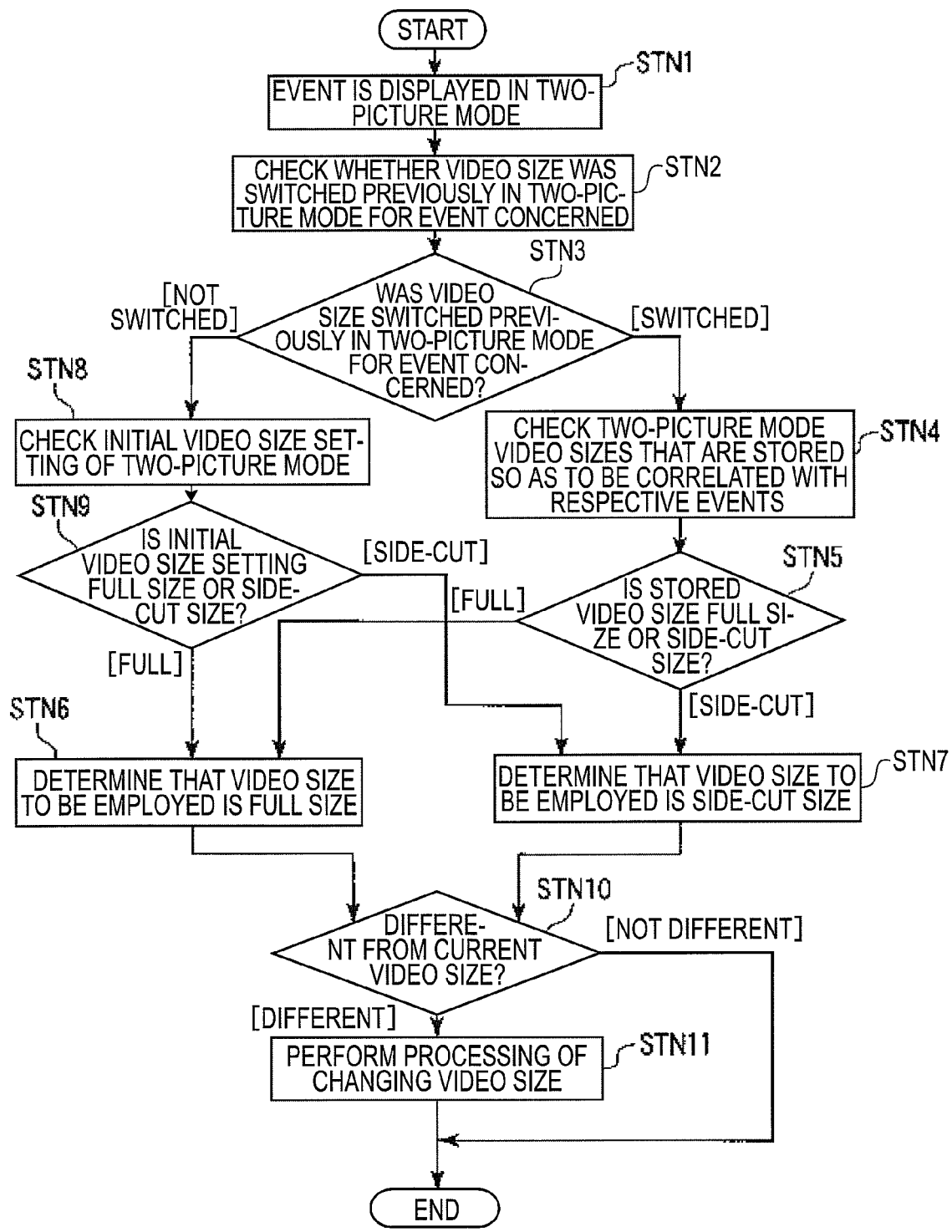
FIG. 17 is a flowchart showing an example video size switching control method in a video processing apparatus according to a 14th embodiment of the invention.

An example video size control operation will be described below with reference to FIG. 17. First, if an even is displayed in the two-picture mode (step STN1), at step STN2 the video size switching module SW checks whether the video size was switched previously in the two-picture mode for the event being viewed.

If the video size was not switched previously for the event being viewed (step STN3), at step STN8 the video size switching module SW checks an initial video size setting of the two-picture mode. If the initial video size setting of the two-picture mode is the full size (step STN9), at step STN6 the video size switching module SW determines that the video size that should be employed is the full size. If the initial video size setting of the two-picture mode is the side-cut size (step STN9), at step STN7 the video size switching module SW determines that the video size that should be employed is the side-cut size.

If the video size was switched previously for the event being viewed (step STN3), at step STN4 the video size switching module SW checks video sizes that are stored in the video size memory M so as to be correlated with respective events. If the video size that is stored in the video size memory M as corresponding to the event concerned is the full size (step STN5), the video size switching module SW determines at step STN6 that the video size that should be employed is the full size. If the video size that is stored in the video size memory M as corresponding to the event concerned is the side-cut size (step STN5), the video size switching module SW determines at step STN7 that the video size that should be employed is the side-cut size.

Upon determination of the video size to be employed, the video size switching module SW determines at step STN10 whether it is different from the video size of the event being viewed. If the video size to be employed is different from the video size of the event being viewed, at step STN11 the video size switching module SW performs processing of changing the video size. If the video size to be employed is not different from the video size being viewed, the video size switching module SW does not perform the processing of changing the video size.

As described above, the module is provided which employs, in the two-picture mode, a video size for a case that no video size switching was made (i.e., an initial video size setting) as well as a video size that is set so as to be correlated with each event. The side-cut size can be set as an initial video size setting of the two-picture mode. As a result, where the user wants video to be displayed basically in the side-cut size in the two-picture mode, the frequency of video size switching manipulations made in the two-picture mode can be reduced.

That is, the video processing apparatus and the video processing method according to the embodiment can save the user time and labor in connection with the video size mode switching. An easy-to-use video processing apparatus and video signal method can thus be provided.

Next, a video processing apparatus and a video processing method according to a 15th embodiment of the invention will be described below with reference to the drawings. As the above-described video processing apparatus according to the first embodiment, the video processing apparatus according to this embodiment is a digital TV broadcast receiver 11 shown in FIG. 1. A controller 65 is equipped with a video size switching module SW for changing the size of video to be displayed on the video display device 14 and a video size memory M which serves as a storing module for storing pieces of video size information that are set for respective items of a desired category that is selected from plural categories.

Figure 18:
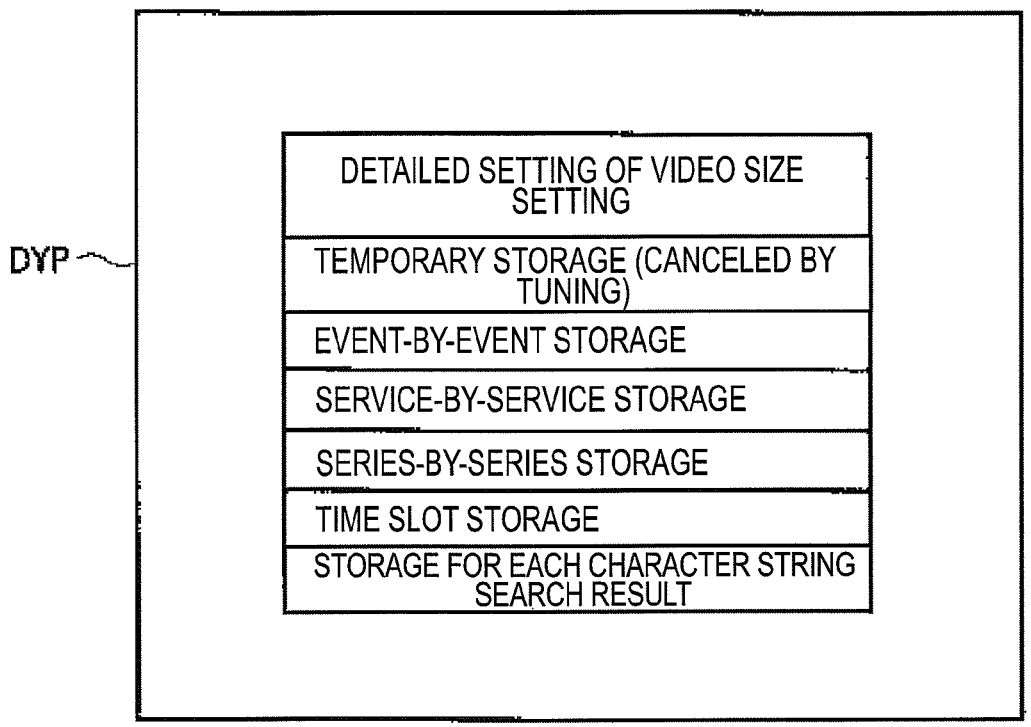
FIG. 18 shows an example video size switching setting screen in a video processing apparatus according to a 15th embodiment of the invention.

The controller 65 further has a menu video processor (not shown) for displaying a setting menu as shown in FIG. 18 on the screen DYP of the video display device 14 by controlling the OSD signal generator 61 in setting a video size. This feature allows the user to make a detailed setting as to video size control.

This feature will be described below in more detail. In the video processing apparatus according to the embodiment, the video size switching module SW has a means for storing pieces of video size information that are set in plural categories and a means for switching the video size of an event concerned based on pieces of video size information that are set in the respective categories.

FIG. 18 shows an example pop-up menu screen for detailed setting of a manner of video size switching. In the video processing apparatus and the video processing method according to the embodiment, the setting menu screen as shown in FIG. 18 is displayed when the user intends to set a video size. The user is thus caused to make a detailed setting as to a manner of video size switching.

With the setting menu screen of FIG. 18, the user is caused to specify, for example, a category for which to store a video size. The user can select a category for which to store a video size by manipulating a cursor button or the like of the remote controller 17. The setting menu screen of FIG. 18 enables selection from temporary storage in which a video size setting is canceled by tuning, event-by-event storage, service-by-service storage, series-by-series storage, time slot storage, and storage for each character string search result. FIG. 18 shows a state that the manner of video size setting is set to the "temporary storage" in which a video size setting is canceled by tuning.

As described above, a setting menu screen is displayed in specifying a video size and the user is thereby allowed to make a detailed setting that relates to video size control. This allows the user to make a detailed setting that relates to video size control in setting a manner of video size switching. Furthermore, this embodiment can accommodate various demands of the user because the user can select a category for which to store a video size.

As such, the video processing apparatus and the video processing method according to the embodiment can save the user time and labor in connection with the video size mode switching. An easy-to-use video processing apparatus and video signal method can thus be provided.

Next, a video processing apparatus and a video processing method according to a 16th embodiment of the invention will be described below with reference to the drawings. As the above-described video processing apparatus according to the first embodiment, the video processing apparatus according to this embodiment is a digital TV broadcast receiver 11 shown in FIG. 1. A controller 65 is equipped with a video size switching module SW for changing the size of video to be displayed on the video display device 14 and a video size memory M which serves as a storing module for storing video sizes that are set for respective events (programs).

Figure 19:
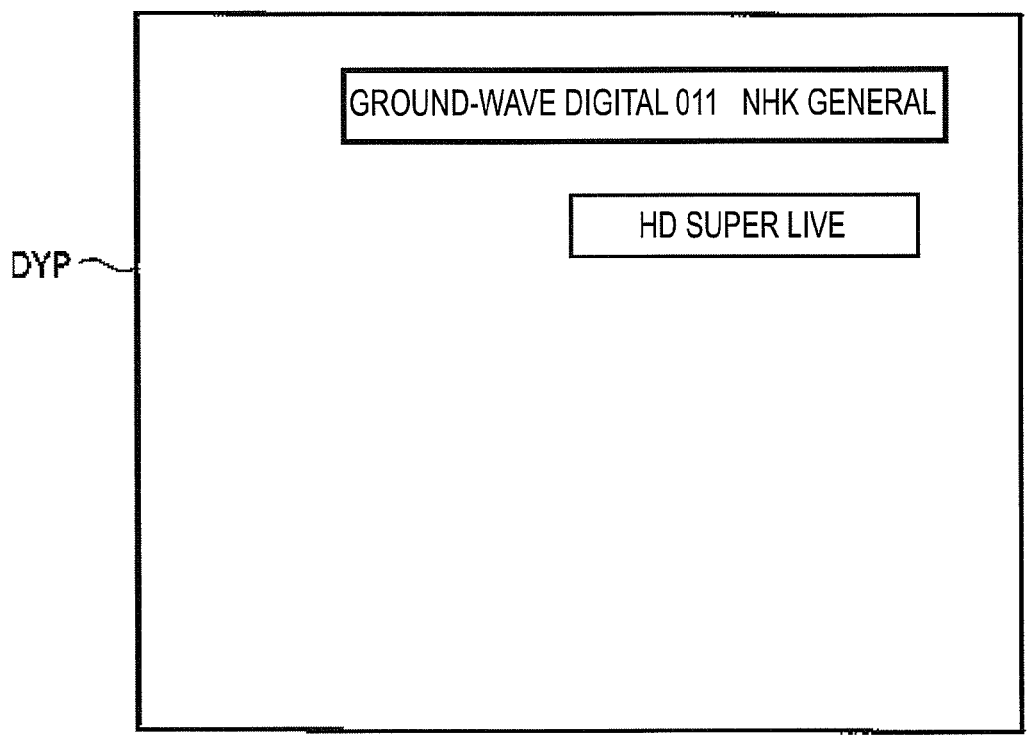
FIG. 19 shows an example video size information display screen in a video processing apparatus according to a 16th embodiment of the invention.

The controller 65 has a video size information video processor (not shown) for displaying video size information as shown in FIG. 19 as information display at the time of tuning and video display in the case where a video size setting of the user has been put into effect.

Alternatively, the controller 65 has a video size information video processor (not shown) for changing the display color or the display pattern of video size information in information display at the time of tuning and video display only in the case where a video size setting of the user has been put into effect.

FIG. 19 shows an example picture which is displayed as information display at the time of tuning and video display. In the example of FIG. 19, a video size has been set to the HD super live size by the user and hence the word "HD super live" is highlighted by changing the color.

More specifically, the video size information video processor displays video size information as information display at the time of tuning and video display by controlling the OSD signal generator 61 only when the video size is set to the HD super live size or the HD zoom size (in the case of the two-picture mode, the side-cut size).

Alternatively, the video size information video processor changes the display color or the display pattern of video size information in information display at the time of tuning and video display by controlling the OSD signal generator 61 only when the video size is set to the HD super live size or the HD zoom size (in the case of the two-picture mode, the side-cut size).

Displaying video size information in the above-described manner allows the user to recognize more strongly that video size setting of the user has been put into effect than in the case where no video size information is displayed in information display at the time of tuning and video display or video size information is always displayed irrespective of whether the video size has been switched.

Where video sizes are stored for respective events or services, the video size is switched automatically in response to a tuning manipulation and hence it may be difficult for the user to recognize with what video size current video is being viewed. Highlighting video size information in information display at the time of tuning and video display only in the case where a video size setting of the user has been put into effect can increase the ease of use for the user.

As such, the video processing apparatus and the video processing method according to the embodiment can save the user time and labor in connection with the video size mode switching. An easy-to-use video processing apparatus and video signal method can thus be provided.

The invention is not limited to the above embodiments themselves, and can be practiced in such a manner that constituent elements are modified without departing from the spirit and scope of the invention. For example, although the video processing apparatus 11 of each embodiment incorporates the video display device 14 having the screen DYP, the video display device 14 may be an externally connected one.

Although in the video processing apparatus 11 of each embodiment the video size is switched between the full size, the HD super line size, and the HD zoom size, the video size may also be switched to another size in a video processing apparatus capable of such switching.

In the video processing apparatus according to the 10th and 11th embodiments, event information (network ID/service ID/event ID) of an event for which a video size has been set and the set video size are stored so as to be coupled with each other. However, the event information is not limited to a combination of a network ID, a service ID, and an event ID and may be any information that enables identification of an associated event.

Where video sizes that are set for respective services are stored in the video size memory as in the video processing apparatus according to the second embodiment, it is not necessary to identify each event. Therefore, information for identifying a network and information for identifying a service may be stored in the video size memory M as event information.

As described above with reference to the embodiments, the invention provides an easy-to-use apparatus and method for processing video while saving a user's time and labor in switching the video size mode.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A video displaying apparatus comprising:
   a reception module configured to selectively receive signals;
   a signal processing module configured to perform signal processing on a signal received by the reception module;
   a display module configured to process the signal performed with the signal processing to output a video signal for displaying an image; and
   a control module configured to control the reception module, the signal processing module, and the display module,
   wherein the control module comprises,
   a storage module;
   an event video size information module configured to store video size information in the storage module for each events when a user switches video size, and to cancel, when the user switches video size of an event and selects after the event is completed, screen size setting being set for the event before the selection; and
   an event video size information search module configured to search, when the user reselects the event, video size information of the selected event and switch video size of the event based on the video size information stored in the storage module.

2. The video displaying apparatus of claim 1, wherein the control module comprises:
   a module configured to store the video size information in the storage module for each service when the user switches the video size; and
   a search module configured to search, when the user reselects the service, for video size information of the service and switch to the searched video size of the service based on the video size information stored in the storage module.

3. The video displaying apparatus of claim 1, wherein the control module further comprises:
   a deleting module configured to delete, when the user selects after switching the video size of the event, video size information that is set in the storage module for the event before the selection from the storage module.

4. The video displaying apparatus of claim 1, wherein the control module further comprises:
   a deleting module configured to delete, when the user switches the video size of the event and selects after completion of the event, video size information that is set in the storage module for the event before the selection.

5. The video displaying apparatus of claim 1, wherein the control module comprises:
   an advertisement determining module configured to determine whether an event or a service being viewed is in an advertisement period; and
   a resetting module configured to reset the video size to an initial setting when the event or the service is in the advertisement period.

6. The video displaying apparatus of claim 1, wherein the control module comprises:
   a time slot setting module configured to set a time slot during which to control the video size and to store information indicating the time slot in the storage module; and
   a time slot video size switching module configured to check whether or not in set time slot and to switch the video size.

7. The video displaying apparatus of claim 1, wherein the control module comprises:
   a module configured to cause the display module to display a setting screen in which the user selects an event or a service on an electronic program guide and sets a video size for the event or the service.

8. The video displaying apparatus of claim 1, wherein the control module comprises:
   a module configured to store the video size information in the storing module for a series basis when the user switches the video size; and
   a module configured to check, when the series is reselected, the video size information of the selected series and to switch to the video size stored in the storage module.

9. The video displaying apparatus of claim 1, wherein the control module comprises:
   a search module configured to search for events having titles comprising a character string input by the user; and
   a video size setting module configured to set video sizes for events listed by the search module and to store in the storage module.

10. The video displaying apparatus of claim 1, wherein the video size information is a set of event information of an event for which a video size is set and the video size being set, and wherein the event information comprises information for identifying a network, information for identifying a service, and information for identifying the event.

11. The video displaying apparatus of claim 1, wherein the control module comprises:
    a determining module configured to determine whether the storage module comprises a sufficient free area when storing the video size information in the storage module;
    a deleting module configured to delete oldest video size information among the video size information in the storage module when the determining module determines that the free area is insufficient.

12. The video displaying apparatus of claim 1, wherein the control module comprises:

a deleting module configured to delete video size information of an event that has already finished among the video size information stored in the storage module before storing the video size information in the storage module.

13. The video displaying apparatus of claim 1, wherein the control module further comprises:

a two-picture display module configured to display in a two-picture mode by dividing a display screen of the display module into two regions and displaying video on each of the regions; and a video size switching module, wherein the video size switching module comprises a two-picture mode video size switching module configured to switch the video size of the video that is displayed on each of the regions.

14. The video displaying apparatus of claim 13, wherein the control module further comprises:

a single-picture mode video size check module configured to check a single-picture mode video size setting of an event that is displayed in the two-picture mode; and a single-picture mode video size switching module configured to automatically switch the video size into a side-cut mode when the video size for the single-picture mode video size is set in a high definition (HD) super live mode or in an HD zoom mode.

15. The video displaying apparatus of claim 13, wherein the control module further comprises a video size initializing module configured to set an initial video size setting for the two-picture mode.

16. The video displaying apparatus of claim 1, wherein the control module further comprises a setting menu display module configured to display a setting menu screen that allows the user to select a video size setting category in setting a video size.

17. The video displaying apparatus of claim 1, wherein the control module further comprises:

a video size information display module configured to display the video size information of the event stored in the storage module when selecting the event and/or displaying the event in a case where the video size setting is set by the user for the event.

* * * * *